US012072496B2

(12) United States Patent
Babazaki et al.

(10) Patent No.: US 12,072,496 B2
(45) Date of Patent: Aug. 27, 2024

(54) INFORMATION PROCESSING DEVICE, CONTROL METHOD, AND STORAGE MEDIUM

(71) Applicant: NEC Corporation, Tokyo (JP)

(72) Inventors: Yasunori Babazaki, Tokyo (JP); Akane Aruga, Tokyo (JP); Katsumi Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 31 days.

(21) Appl. No.: 17/783,450

(22) PCT Filed: Dec. 24, 2019

(86) PCT No.: PCT/JP2019/050628
§ 371 (c)(1),
(2) Date: Jun. 8, 2022

(87) PCT Pub. No.: WO2021/130860
PCT Pub. Date: Jul. 1, 2021

(65) Prior Publication Data
US 2023/0011625 A1    Jan. 12, 2023

(51) Int. Cl.
*G02B 27/01* (2006.01)
*G06T 7/70* (2017.01)

(52) U.S. Cl.
CPC ............ *G02B 27/0172* (2013.01); *G06T 7/70* (2017.01)

(58) Field of Classification Search
CPC .............................. G02B 27/0172; G06T 7/70
See application file for complete search history.

(56) References Cited

U.S. PATENT DOCUMENTS

2010/0098324 A1   4/2010   Fujieda
2011/0187746 A1   8/2011   Suto et al.
(Continued)

FOREIGN PATENT DOCUMENTS

JP   2010-113731 A   5/2010
JP   2011-159162 A   8/2011
(Continued)

OTHER PUBLICATIONS

International Search Report for PCT Application No. PCT/JP2019/050628, mailed on Mar. 24, 2020.

*Primary Examiner* — Nelson M Rosario
*Assistant Examiner* — Scott D Au

(57) ABSTRACT

The information processing device 4 includes an acquisition unit 41A and a structure matching unit 43A. The acquisition unit 41A is configured to acquire, from a captured image captured by a photographing unit 15A of a display device configured to display a virtual object superimposed on a view, multiple combinations of classification information of a structural feature point that is a feature point, in structure, of a target structure and position information of the structural feature point. The structure matching unit 43A is configured to generate coordinate transformation information by matching structure data "Ds" with the multiple combinations, the structure data Ds including information associated with a position and a class of each of structural feature points of the target structure, the coordinate transformation information relating to a coordinate transformation between a first coordinate system that is a coordinate system referred to by the display device and a second coordinate system that is a coordinate system adopted in the structure data Ds.

11 Claims, 14 Drawing Sheets

(56) References Cited

U.S. PATENT DOCUMENTS

2014/0320526 A1    10/2014   Yamakawa
2021/0082143 A1     3/2021   Lee
2021/0375052 A1*   12/2021   Abiko .................... A63F 13/65

FOREIGN PATENT DOCUMENTS

| JP | 2014-032623 A | 2/2014 |
| JP | 2014-215755 A | 11/2014 |
| WO | 2019/130945 A1 | 7/2019 |

* cited by examiner

INFORMATION PROCESSING DEVICE, CONTROL METHOD, AND STORAGE MEDIUM

This application is a National Stage Entry of PCT/JP2019/050628 filed on Dec. 24, 2019, the contents of all of which are incorporated herein by reference, in their entirety.

TECHNICAL FIELD

The present invention relates to a technical field of an information processing device, a control method, and a storage medium for performing processing related to space understanding in augmented reality (AR: Augmented Reality).

BACKGROUND ART

For such a device providing an augmented reality, there is a technique of determining the display position of an image (so-called AR image) to be displayed over the view that the user visually recognizes based on images captured by a camera. For example, Patent Literature 1 discloses an image processing device configured to store feature data representing features of the appearances of objects and to generate an environment map representing the position of an object present in the real space based on an image obtained from an imaging device and the above feature data thereby to display, based on the environment map, a description relating to a series of procedures of the work to be performed in the real space.

CITATION LIST

Patent Literature

Patent Literature 1: JP 2011-159162A

SUMMARY

Problem to be Solved

When the environment map is generated by measuring the real world with a camera or the like, information on objects other than recognition targets is included in the environment map as noise. Then, when recognizing the corresponding relation between the real world space and a reference space of a device by matching the environment map including noise with the feature data of the recognition targets stored in advance, there are issues that it needs a huge amount of calculation and causes the decrease in matching accuracy due to noise.

In view of the above-described issue, it is therefore an example object of the present disclosure to provide an information processing device, a control method, and a storage medium capable of suitably realizing the accuracy improvement in the matching and the reduction of the calculation amount of the matching which is necessary to grasp the correspondence relation between the spaces in the augmented reality.

Means for Solving the Problem

In one mode of the information processing device, there is provided an information processing device including: an acquisition unit configured to acquire, from a captured image captured by a photographing unit of a display device configured to display a virtual object superimposed on a view, multiple combinations of classification information of a structural feature point that is a feature point, in structure, of a target structure and position information of the structural feature point; and a structure matching unit configured to generate coordinate transformation information by matching structure data with the multiple combinations, the structure data including information associated with a position and a class of each of structural feature points of the target structure, the coordinate transformation information relating to a coordinate transformation between a first coordinate system that is a coordinate system referred to by the display device and a second coordinate system that is a coordinate system adopted in the structure data.

In one mode of the control method, there is provided a control method executed by an information processing device, the control method including: acquiring, from a captured image captured by a photographing unit of a display device configured to display a virtual object superimposed on a view, multiple combinations of classification information of a structural feature point that is a feature point, in structure, of a target structure and position information of the structural feature point; and generating coordinate transformation information by matching structure data with the multiple combinations, the structure data including information associated with a position and a class of each of structural feature points of the target structure, the coordinate transformation information relating to a coordinate transformation between a first coordinate system that is a coordinate system referred to by the display device and a second coordinate system that is a coordinate system adopted in the structure data.

In one mode of the storage medium, there is provided a storage medium storing a program executed by a computer, the program causing the computer to function as: a storage medium storing a program executed by a computer, the program causing the computer to function as: an acquisition unit configured to acquire, from a captured image captured by a photographing unit of a display device configured to display a virtual object superimposed on a view, multiple combinations of classification information of a structural feature point that is a feature point, in structure, of a target structure and position information of the structural feature point; and a structure matching unit configured to generate coordinate transformation information by matching structure data with the multiple combinations, the structure data including information associated with a position and a class of each of structural feature points of the target structure, the coordinate transformation information relating to a coordinate transformation between a first coordinate system that is a coordinate system referred to by the display device and a second coordinate system that is a coordinate system adopted in the structure data.

Effect

An example advantage according to the present invention is to realize the accuracy improvement in the matching and the reduction of the calculation amount of the matching which is necessary to generate coordinate transformation information relating to the transformation of coordinate systems used in the augmented reality.

EXAMPLE EMBODIMENTS

Hereinafter, an example embodiment of an information processing device, a control method, and a storage medium will be described with reference to the drawings.

First Example Embodiment (1) Schematic Configuration

Figure 1:
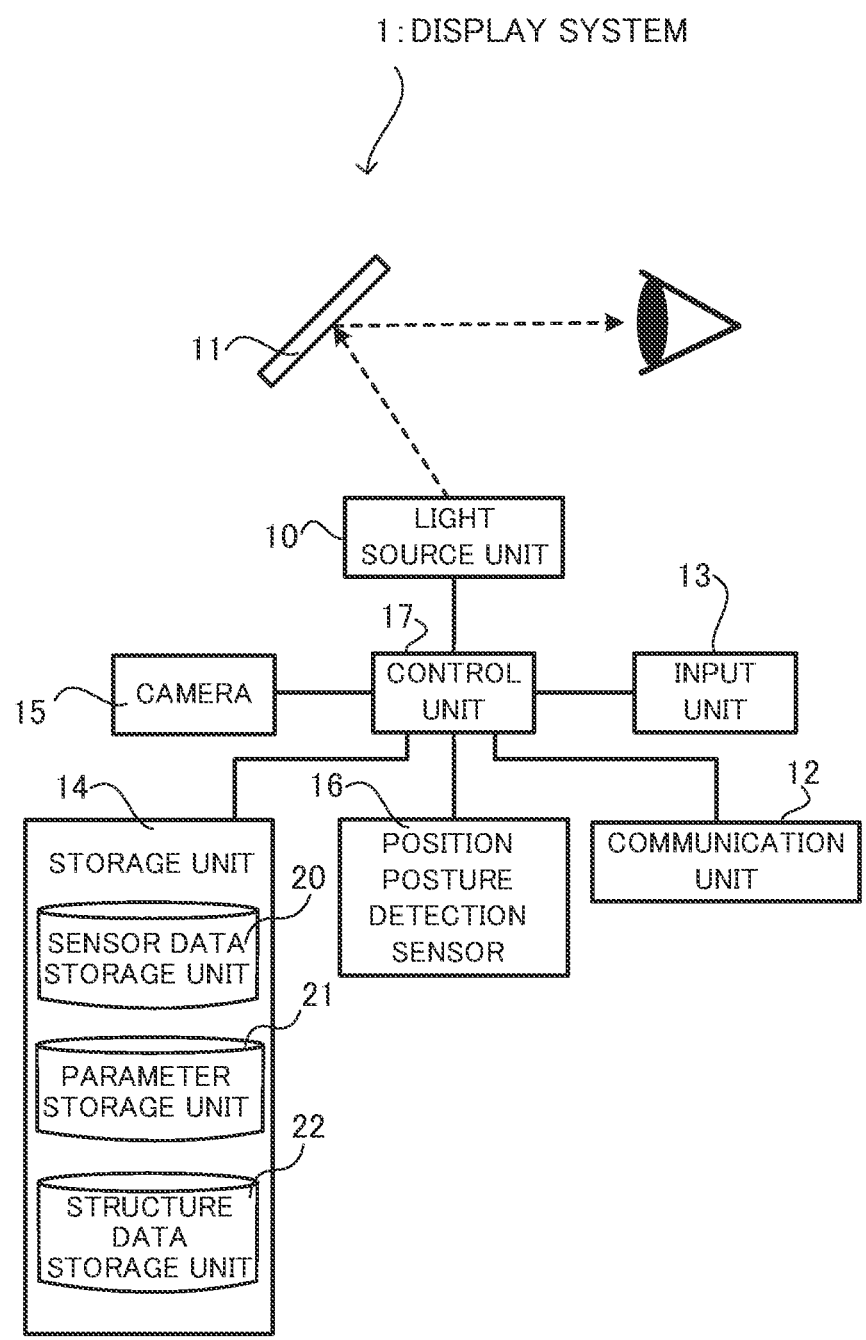
FIG. 1 is a schematic configuration diagram of a display device according to a first example embodiment.

FIG. 1 is a schematic configuration diagram of a display device 1 according to the first example embodiment. The display device 1 is a user-wearable device, and examples of the display device 1 include a see-through eyeglass device configured to be wearable on the head of the user. Then, the display device 1 provides an augmented reality (AR: Augmented Reality) in the sports viewing or theater (including concert) viewing or the like by displaying visual information superimposed on the real view (scenery). The visual information is a two or three dimensional virtual object, and is referred to as "virtual object" hereinafter. The display device 1 may display the virtual object only on one eye of the user, or may display the virtual object on both eyes.

In the present example embodiment, on such an assumption that there is a stationary structure (also referred to as "target structure") serving as a sports field or a theater field, the display device 1 superimposes and displays, over or around the target structure, the virtual object that indicates additional information to assist the user in performing sports viewing or theater viewing. Examples of the target structure include sports fields (e.g., tennis courts, swimming pools, and stadiums), and theater fields (e.g., theaters, concert halls, multi-purpose halls, and other various stages). As will be described later, the target structure has a plurality of feature points (also referred to as "structural feature points") characterized in structure (e.g., shape).

Examples of the virtual object include a score board to be displayed above the tennis court in the case of tennis, and a line indicative of the world record in real time to be superimposed on a pool during a swimming competition in the case of competitive swimming, and include a virtual performer to be superimposed on the stage in a theater.

The display device 1 includes a light source unit 10, an optical element 11, a communication unit 12, an input unit 13, a storage unit 14, a camera 15, a position posture detection sensor 16, and a control unit 17.

The light source unit 10 has a light source such as a laser light source and/or an LCD (Liquid Crystal Display) light source and emits light based on the driving signal supplied from the control unit 17. The optical element 11 has a predetermined transmittance and lets at least a portion of the external light pass through to enter the user's eye, and reflects at least a portion of the light from the light source unit 10 toward the user's eye. Thus, the virtual image corresponding to the virtual object formed by the display device 1 is visually recognized by the user in such a state where the virtual image overlaps with the view (scenery). The optical element 11 may be a half mirror whose transmittance and reflectance are substantially equal, or a mirror (so-called beam splitter) whose transmittance and reflectance are not equal.

The communication unit 12 performs transmission and reception of data with external devices based on the control by the control unit 17. For example, in the case where the user uses the display device 1 for a sports viewing or a theater viewing, on the basis of the control by the control unit 17, the communication unit 12 receives information on the virtual object to be displayed by the display device 1 from a server device managed by a promoter.

The input unit 13 generates an input signal based on the user's operation and transmits the input signal to the control unit 17. Examples of the input unit 13 include a button, an arrow pad, and a voice input device which are used for the user to instruct the display device 1.

The camera 15 generates, based on the control by the control unit 17, an image in which the front direction of the display device 1 is photographed, and supplies the generated image (also referred to as "captured image Im") to the control unit 17.

The position posture detection sensor 16 is one or more sensors (sensor group) configured to detect the position and posture (orientation) of the display device 1. Examples of the position posture detection sensor 16 include a positioning sensor such as a GPS (Global Positioning Satellite) receiver, and a posture detection sensor configured to detect the change in the relative posture of the display device 1 such as a gyroscope sensor, an acceleration sensor, an IMU (Inertial Measurement Unit). The position posture detection sensor 16 supplies the generated detection signal relating to the position and posture of the display device 1 to the control unit 17. As will be described later, the control unit 17 detects, based on the detection signal supplied from the position posture detection sensor 16, the magnitude of variation in the position and the posture of the display device 1 from the start-up or the like. Instead of detecting the position of the display device 1 by using the positioning sensor, the control unit 17 may identify the position of the display device 1 based on a signal received from a beacon terminal or a wireless LAN device provided in the venue, for example. In another example, the control unit 17 may identify the position of the display device 1 based on a known position estimation technique using an AR marker. In these cases, the position posture detection sensor 16 may not include any positioning sensor.

The control unit 17 includes performs overall control of the display device 1 and includes, for example, one or more processors such as a CPU (Central Processing Unit) and a GPU (Graphics Processing Unit) and a volatile memory that functions as a working memory of the processor.

For example, at the display timing of the virtual object, the control unit 17 performs a calibration process for associating the real world space with a space referred to by the display device 1 on the basis of the structural feature points of the target structure identified from the captured image Im. In this calibration process, the control unit 17 generates coordinate transformation information for coordinate transformation from a three-dimensional coordinate system (also referred to as "device coordinate system") set with reference to the display device 1 to a three-dimensional coordinate system (also referred to as "structural coordinate system") set with reference to the target structure. Details of the calibration process will be described later. Then, the control unit 17 generates a driving signal for driving the light source unit 10 based on the above-described coordinate transformation information and the like, and supplies the driving signal to the light source unit 10 thereby to let the light source unit 10 emit light (also referred to as "display light") for displaying the virtual object toward the optical element 11. Thereby, the control unit 17 allows the user to visually recognize the virtual object.

The storage unit 14 is a nonvolatile memory configured to store various information necessary for the control unit 17 to control the display device 1. The storage 14 may include a removable storage medium such as a flash memory. Further, the storage unit 14 stores a program to be executed by the control unit 17.

The storage unit 14 includes a sensor data storage unit 20, a parameter storage unit 21, and a structure data storage unit 22.

The sensor data storage unit 20 stores captured images Im generated by the camera 15 in association with the magnitude of the variation (also referred to as "position posture variation amount Ap") from the position and the posture of the display device 1 at the time (e.g., startup of the display device 1) of setting the device coordinate system to the position and the posture of the display device 1 at the time of generating each of the captured images Im. In this case, for example, based on the detection signal generated by the position posture detection sensor 16, the control unit 17 continuously calculates the magnitude of the variation corresponding to the current position and the posture with reference to the position and the posture at the time of setting the device coordinate system. Then, when storing a captured image Im generated by the camera 15 in the sensor data storage unit 20, the control unit 17 stores the position posture variation amount Ap calculated at the time of generating the captured image Im in the sensor data storage unit 20 in association with the captured image Im. For example, the control unit 17 stores a set of the captured images Im, which are generated during the latest predetermined time period or which are a predetermined number of latest images, and the position posture variation amount Ap in the sensor data storage unit 20. The information stored in the sensor data storage unit 20 is used in the calibration process.

The parameter storage unit 21 stores, in the calibration process, the position information of the structural feature point of the target structure and the parameters of the identifier to be used when extracting the classification information of the structural feature points from the captured image Im. The above-described identifier is, for example, a learning model learned to output a reliability map, in the input image, of a target structural feature point of identification for each class of the structural feature points when the captured image Im is inputted thereto as an input image. The reliability map is a map on an image indicative of the reliability of each coordinate value for being the target structural feature point. The term "coordinate value" may be a value indicative of a position in an image in one-pixel units, or may be a value indicative of a position in an image in sub-pixel units. The learning model used for learning of the identifier may be a learning model based on a neural network, or may be any other type of a learning model such as a support vector machine, or may be a combination of these. For example, when the above-described learning model is a neural network such as a convolutional neural network, the parameter storage unit 21 stores various parameters such as a layer structure, a neuron structure of each layer, the number of filters and the filter size in each layer, and the weight of each element of each filter. It is noted that the identifier is not limited to what outputs a reliability map of the target structural feature point and it may be a regression type identifier configured to output information indicative of the coordinate value, in the input image, of the target structural feature point.

Figure 2:
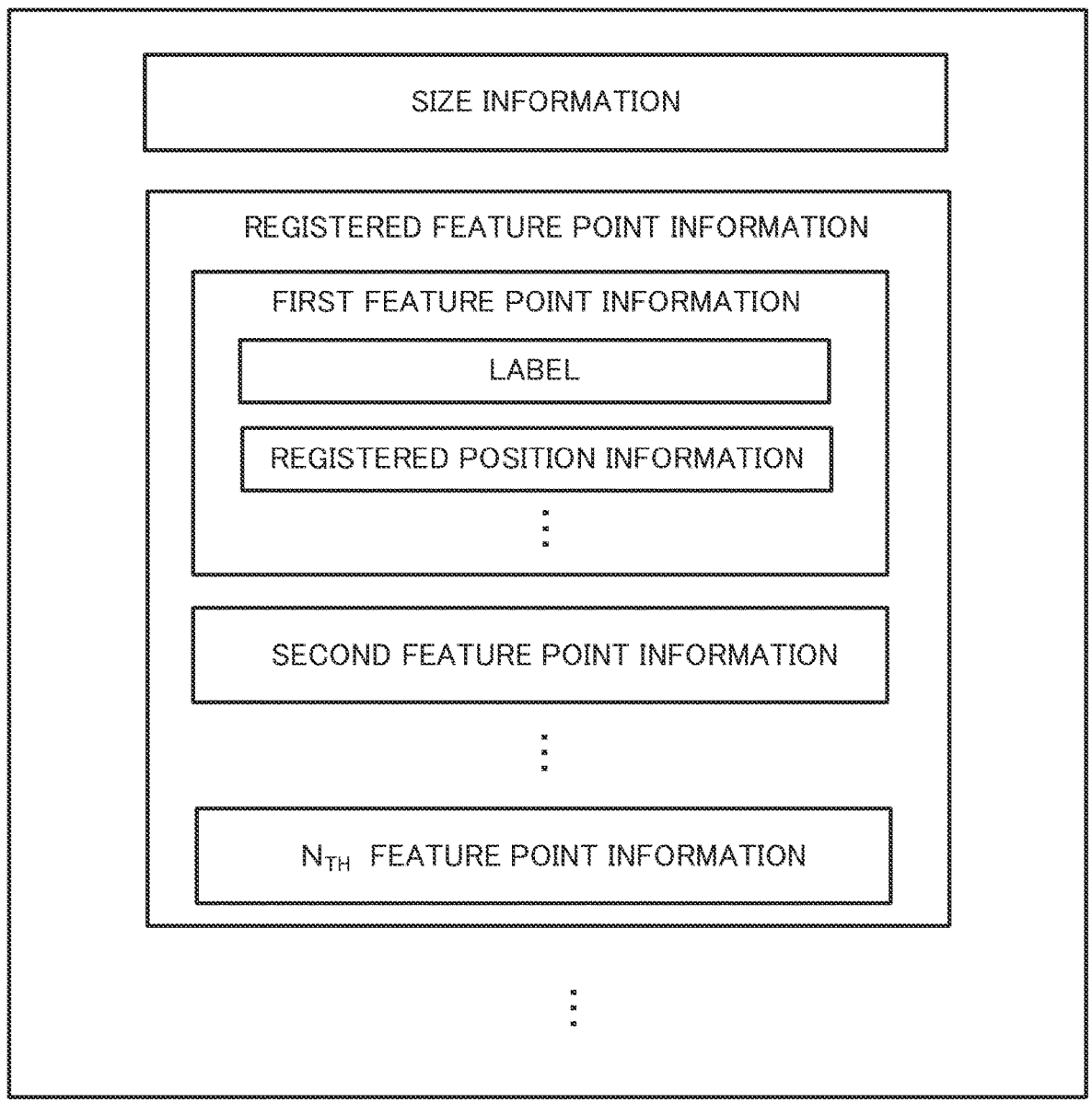
FIG. 2 illustrates an example of the data structure of structure data.

The structure data storage unit 22 stores structure data regarding the structure of the target structure. FIG. 2 shows an example of a data structure of structure data. The structure data includes size information and registered feature point information. The size information is information indicative of the size of the target structure. For example, the structure data of a tennis court is information indicative of the vertical and horizontal width of the court and the structure data of a theater is information indicative of the width (and height) of the stage. The size information is not limited to the information relating to the overall size of the target structure, and it may be any information indicating distances among the structural feature points detected in the calibration process, as will be described later.

The registered feature point information is information associated with the structural feature points of the target structure, and includes individual information measured beforehand for each structural feature point. Here, since the target structure Tag has N structural feature points (N is an integer of 2 or more), the registered feature point information includes N pieces of information (first structural feature point information to N structural feature point information) corresponding to the N structural feature points, respectively. The registered feature point information includes at least a label indicating the class of each structural feature point and registered position information indicating the position of the each structural feature point. The registered position information is coordinate information expressed by the structural coordinate system where the position of any of the structural feature points is set to be the origin, for example. The registered feature point information is used for matching with the information indicative of the structural feature points identified from the captured image Im.

In addition, the structure data may further include information indicative of the structural feature point to be the origin in the structural coordinate system and information indicative of each direction of the three axes of the structural coordinate system, respectively.

The configuration of the display device 1 shown in FIG. 1 is an example, and various modifications may be applied to this configuration. For example, the display device 1 may further include a speaker for outputting sound based on the control by the control unit 17. Further, the display device 1 may be provided with an eye gaze detection camera for changing the presence or absence of displaying the virtual object or the display position of the virtual object according to the position of the user's eye gaze. In yet another example, the storage unit 14 may not include the sensor data storage unit 20. In this case, the control unit 17 performs the calibration process by using the captured image Im acquired in real time from the camera 15 and the position posture variation amount Ap calculated based on the detection signal from the position posture detection sensor 16.

In yet another example, the display device 1 may not detect the position of the display device 1 by the position posture detection sensor 16 or the like. In general, it is rare for a user to move during an observation of a sports or a theatrical play, and the effect thereby on the display of the virtual object by the variation in the position of the display device 1 is small in comparison with the effect by the variation in the posture of the display device 1. Considering the above, the position posture detection sensor 16 includes one or more sensors for detecting the posture of the display device 1, and the control unit 17 may calculate, as the position posture variation amount Ap, only the magnitude of the variation in the posture of the display device 1 from the time of setting the device coordinate system.

(2) Functional Block

Figure 3:
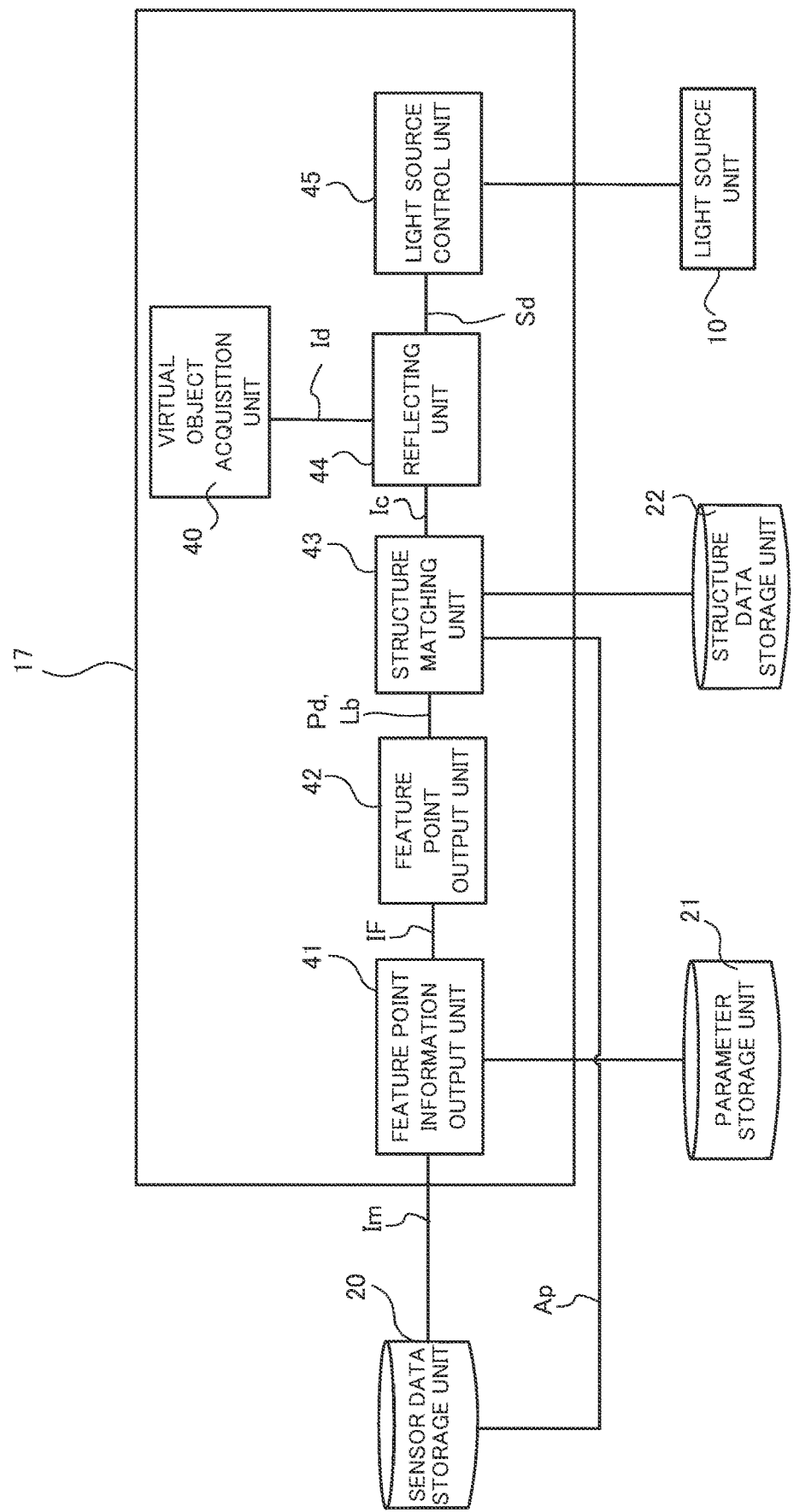
FIG. 3 is a block diagram showing a functional configuration of a control unit.

FIG. 3 is a block diagram showing a functional configuration of the control unit 17. As shown in FIG. 3, the control unit 17 functionally includes a virtual object acquisition unit 40, a feature point information output unit 41, a feature point output unit 42, a structure matching unit 43, a reflecting unit 44, and a light source control unit 45.

The virtual object acquisition unit 40 acquires information (also referred to as "designation display information Id") in which a virtual object to be superimposed over a view and its display position are designated. This virtual object may be information (two-dimensional drawing information) for two-dimensional object drawing, or it may be information (three-dimensional drawing information) for three-dimensional object drawing. For example, when a server device managed by a promoter and the display device 1 can communicate with each other, the virtual object acquisition unit 40 acquires, as the designation display information Id, the distribution information to be distributed from the server device at a predetermined timing according to a push distribution mode or pull distribution model. In this case, the designation display information Id includes not only information indicative of the virtual object but also information (e.g., information indicating the coordinate value in the structural coordinate system) indicative of the display position thereof. In another example, information indicating one or more combinations of the virtual object and the display position and the display condition to display the virtual object may be stored in advance in the storage unit 14. In this case, when it is determined that the stored display condition is satisfied, the virtual object acquisition unit 40 acquires the virtual object and its display position corresponding to the satisfied display condition as the designation display information Id.

The feature point information output unit 41 acquires the captured image Im from the sensor data storage unit 20, and configures the identifier based on the parameters extracted from the parameter storage unit 21. Then, the feature point information output unit 41 inputs the captured image Im to the identifier, thereby generating structural feature point information "IF". In this case, in some embodiments, the feature point information output unit 41 acquires the latest captured image Im from the sensor data storage unit 20. Here, the identifier is a learning model that is learned to output, when a captured image Im is inputted thereto, the structural feature point information IF that is information on the position of each structural feature point in the captured image Im for each class of the structural feature points.

Based on the structural feature point information IF outputted by the feature point information output unit 41, the feature point output unit 42 outputs, to the structure verification unit 43, a plurality of combinations of the position (also referred to as "structural feature point position Pd") of each structural feature point in the captured image Im and a label (also referred to as "label Lb") indicating the class of the each structural feature point. As will be described later, the feature point output unit 42 supplies the structure matching unit 43 with at least two or more combinations of the structural feature point position Pd and the label Lb that are not aligned on a straight line. The plurality of combinations of the structural feature point position Pd and the label Lb is an example of "multiple combinations of classification information of a structural feature point and position information of the structural feature point" in the present disclosure.

Here, a method for determining the structural feature point position Pd will be supplementarily described. For example, when the reliability map in the image for each class of the structural feature points is included in the structural feature point information IF, the feature point output unit 42 determines the structural feature point position Pd to be the coordinate value at which the reliability becomes the maximum for each class of the structural feature points. Then, the feature point output unit 42 associates the structural feature point position Pd for each class of the structural feature points with the label Lb indicating the each class and outputs them to the structure matching unit 43. If the maximum value of the reliability relating to a certain class is less than a predetermined threshold value, the feature point output unit 42 may not output the label Lb and the structural feature point position Pd corresponding to the certain class to the structure matching unit 43.

On the other hand, when the coordinate value in the image for each class of the structural feature points is included in the structural feature point information IF, the feature point output unit 42 determines the coordinate value as the structural feature point position Pd and outputs the coordinate value to the structure matching unit 43 in association with the label Lb indicating the each class. When the coordinate value included in the structural feature point information IF is a value normalized so as not to depend on the image size, the feature point output unit 42 calculates the structural feature point position Pd by multiplying the coordinate value included in the structural feature point information IF by the image size of the captured image Im.

By matching the structure data extracted from the structure data storage unit 22 with a plurality of combinations of the structural feature point position Pd and the label Lb supplied from the feature point output unit 42, the structure matching unit 43 generates coordinate transformation information "Ic" necessary for coordinate transformation from the device coordinate system to the structural coordinate system. In this case, the structure matching unit 43 identifies the position of each structural feature point position Pd in the device coordinate system based on the position posture variation amount Ap at the time of generating the captured image Im subjected to the feature extraction and the size information of the target structure. Then, the structure matching unit 43 generates the coordinate transformation information Ic by matching, for each label, the detected position of the structural feature point in the device coordinate system with the position of the structural feature point indicated by the registered position information of the structure data. The coordinate transformation information Ic is, for example, a combination of a rotation matrix and a translation vector generally used to perform coordinate transformation between three-dimensional spaces. The coordinate transformation information Ic is not limited to information to be used for converting data in the structural coordinate system to data in the device coordinate system and it may be information to be used for converting data in the device coordinate system to data in the structural coordinate system. Here, the rotation matrix and the translation vector for converting data in the structural coordinate system to data in the device coordinate system can be converted into a rotation matrix (inverse of the rotation matrix described above) and a translation vector (the translation vector described above with sign inversion) for converting data in the device coordinate system to data in the structural coordinate system. Specific examples of the generation method of the coordinate transformation information Ic will be described later.

By reflecting the coordinate transformation information Ic supplied from the structure matching unit 43 on the designation display information Id supplied from the virtual object acquisition unit 40, the reflecting unit 44 generates a display signal "Sd" indicative of a virtual object to be projected onto the optical element 11. In this case, after matching the device coordinate system with the structural coordinate system by using the coordinate transformation information Ic, the reflection unit 44 generates a display signal Sd based on the designation display information Id. The light source control unit 45 generates, based on the display signal Sd supplied from the reflecting unit 44, a driving signal indicative of the driving timing and the amount of light for driving the light sources (e.g., each light source corresponding to RGB) of the light source unit 10 and supplies the generated driving signal to the light source unit 10.

The description of each process (i.e., process executed by the reflecting unit 44 and the light source control unit 45) after the completion of the calibration (i.e., after calculating the coordinate transformation information Ic) is an example, and a virtual object to be superimposed on a desired view position may be displayed by any method adopted in any existing AR product or the like. Examples of a literature that discloses such a technique include JP2015-116336A, JP2016-525741A. As shown in these literatures, the display device 1 performs an eye gaze detection or the like of the user and performs control so that the virtual object is visually recognized at an appropriate position.

Each component of the virtual object acquisition unit 40, the feature point information output unit 41, the feature point output unit 42, the structure matching unit 43, the reflecting unit 44, and the light source control unit 45 described in FIG. 3 can be realized, for example, by the control unit 17 executing the program. More specifically, each component can be realized by the control unit 17 executing the program stored in the storage unit 14. In addition, the necessary programs may be recorded in any nonvolatile recording medium and installed as necessary to realize each component. Each of these components is not limited to being implemented by software using a program, and may be implemented by any combination of hardware, firmware, and software. Each of these components may also be implemented using user programmable integrated circuitry, such as, for example, FPGA (Field-Programmable Gate Array) or a microcomputer. In this case, the integrated circuit may be used to realize a program functioning as each of the above-described components. Thus, each component may be implemented in hardware other than a processor. The above is the same in other example embodiments to be described later.

(3) Learning of Identifier

Here, training for generating parameters of the identifier to be stored in the parameter storage unit 21 will be supplementally described.

Figure 4:
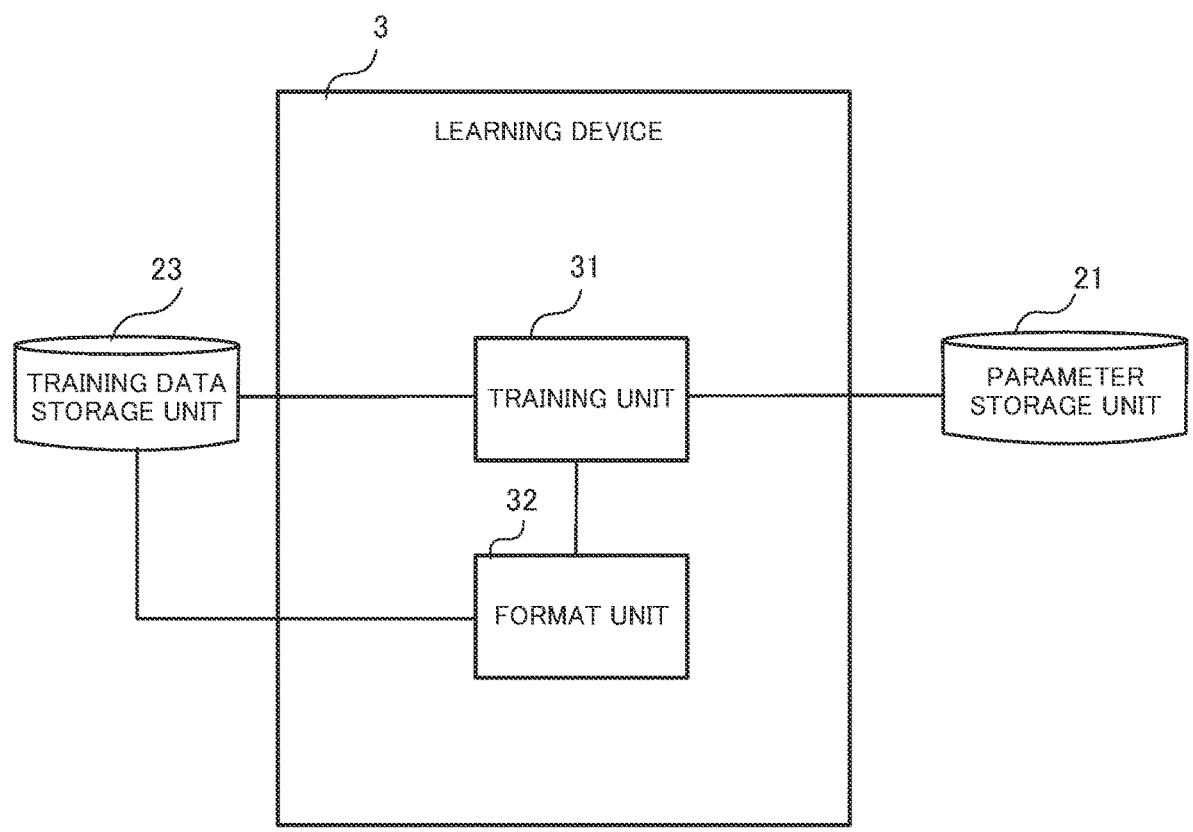
FIG. 4 illustrates a schematic configuration of a learning device for generating parameters of an identifier stored in a parameter storage unit.

FIG. 4 shows a schematic configuration of a learning device 3 that generates parameters of an identifier to be stored in a parameter storage unit 21. The learning device 3 is a device capable of referring to the training data storage unit 23, and may be a display device 1 or any device (e.g., a personal computer or the like) other than the display device 1. The learning device 3 performs training for generating parameters of the identifier to be stored in the parameter storage unit 21 by referring to the training data storage unit 24 at the stage (e.g., manufacturing stage of the display device 1) before the display device 1 is used by user.

The training data storage unit 23 stores multiple sets of a training image in which the target structure is photographed and correct answer data indicating the position and label of each structural feature point in the training image. In this case, in some embodiments, training images in which the target structure Tag existing in various environments (e.g., tennis courts corresponding to various types of the surface if the target structure Tag is a tennis court) is photographed may be stored in the training data storage unit 23. Similarly, training images obtained by photographing the target structure in various imaging environments (e.g., environments in which the presence or absence of illumination or the degree thereof are different) may be stored in the training data storage unit 23. By using such training images, it becomes possible to suitably learn the identifier that is robust to variations in the target structure and changes in the imaging environment.

Further, the learning device 3 functionally includes a training unit 31 and a format unit 32.

The format unit 32 changes the correct answer data stored in the training data storage unit 23 into the same data format as the structural feature point information IF. For example, when the identifier is learned to output a reliability map for the structural feature point for each label, the format unit 32 generates the reliability map indicating the normal distribution of the reliabilities in which the reliability of the coordinate position of the structural feature point indicated by the correct answer data become the maximum value. In contrast, when the identifier is learned to output the coordinate value of the structural feature point for each label, the format unit 32 converts the coordinate position of the structural feature point indicated by the correct answer data into two-dimensional coordinate values normalized to the range of 0 to 1 that is independent of the image size.

The training unit 31 performs training of the learning model (identifier) based on the training images and the data in the appropriate format which the correct answer data is converted by the format unit 32. In this case, for example, the training unit 31 determines the parameters of the identifier such that an error (loss) between the data outputted by the identifier when the training image is inputted to the identifier and the data indicating the correct answer supplied from the format unit 32 is minimized. The algorithm for determining the parameters described above to minimize loss may be any training algorithm used in machine learning, such as a gradient descent method and an error back-propagation method. Then, the training unit 31 stores the parameters of the learned identifier in the parameter storage unit 21.

The display device 1 configures the identifier in the calibration process by using the parameters that is learned as described above. In this case, the identifier suitably outputs accurate structural feature point information IF regardless of the variation of the target structure Tag and the change in the imaging environment by being trained using the training data corresponding to the target structure in variations and various imaging environments.

(4) Example of Generation of Structural Feature Point Information

Next, a specific example of the structural feature point information IF generated by the feature point information output unit 41.

Figure 5A:
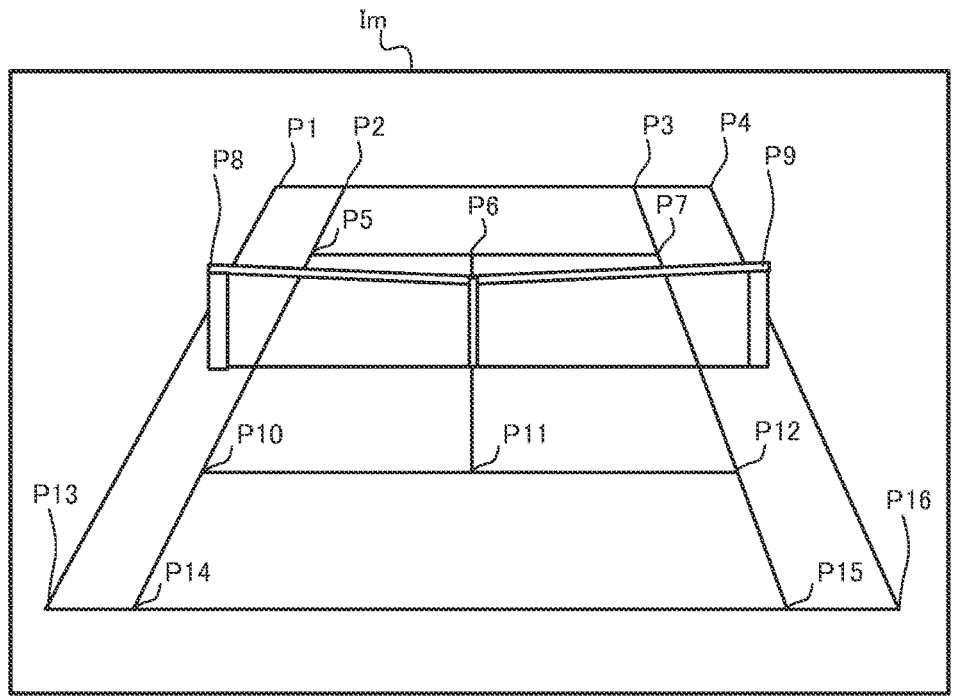
FIG. 5A illustrates an example of a captured image in which a tennis court is photographed as a target structure.
Figure 5B:
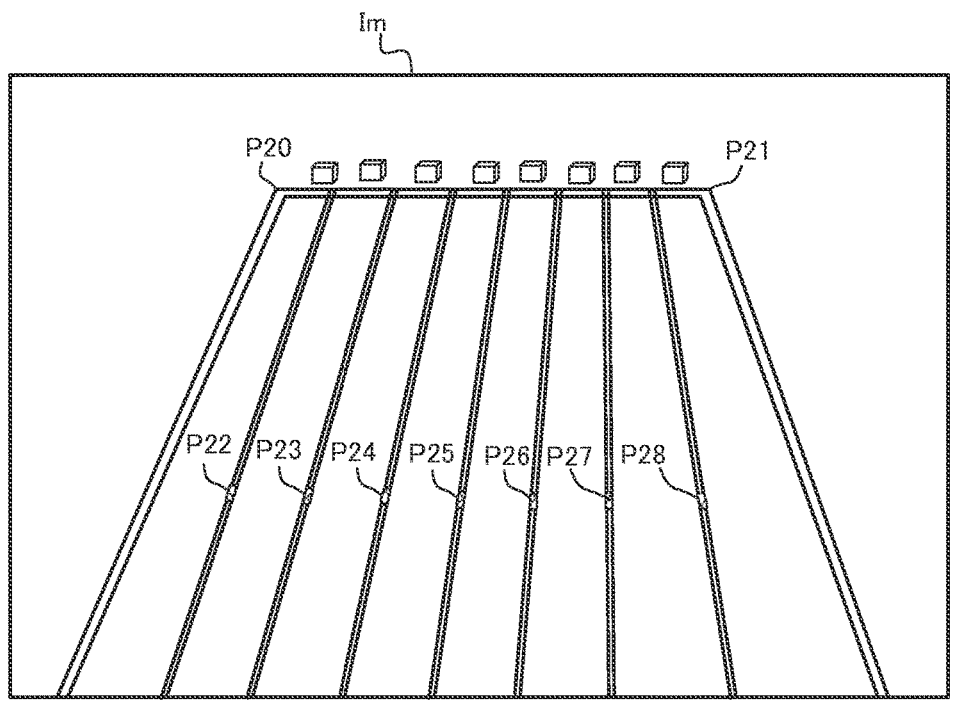
FIG. 5B illustrates an example of a captured image in which a swimming pool is photographed as a target structure.

FIGS. 5A and 5B each shows an example of a captured image Im of the target structure. In the captured image Im shown in FIG. 5A, the tennis court is photographed as a target structure, in the captured image Im shown in FIG. 5B, the swimming pool for competition is photographed as a target structure. Then, sixteen structural feature points "P1" to "P16" in total exist in the captured image Im shown in FIG. 5A, and nine structural feature points "P20" to "P29" in total exist in the captured image Im shown in FIG. 5B. Therefore, when the captured image Im shown in FIG. 5A is used for calibration, the feature point information output unit 41 generates the structural feature point information IF corresponding to each of the sixteen structural feature points P1 to P16. In addition, when the captured image Im shown in FIG. 5B is used for calibration, the structure matching unit 43 generates the structural feature point information IF corresponding to each of the nine structural feature points P20 to P28. As will be described later, the feature point information output unit 41 does not need to generate the structural feature point information IF for all of these structural feature points, and it is sufficient to generate the structural feature point information IF for at least three structural feature points not aligned on a straight line. Further, if one axis of the device coordinate system (first coordinate system) can be assumed to be equivalent to one axis of the structural coordinate system (second coordinate system), it may generate the structural feature point information IF for only two structural feature points. For example, assuming that the vertical axis of the device coordinate system and the vertical axis of the structural coordinate system are equivalent, the plane of the sports field that is a target structure can be determined by using only two points. On the other hand, when any axis of the device coordinate system (first coordinate system) is different from any axis of the structural coordinate system (second coordinate system), as described above, the feature point information output unit 41 generates the structural feature point information IF for at least three structural feature points not aligned on a straight line.

Figure 6:
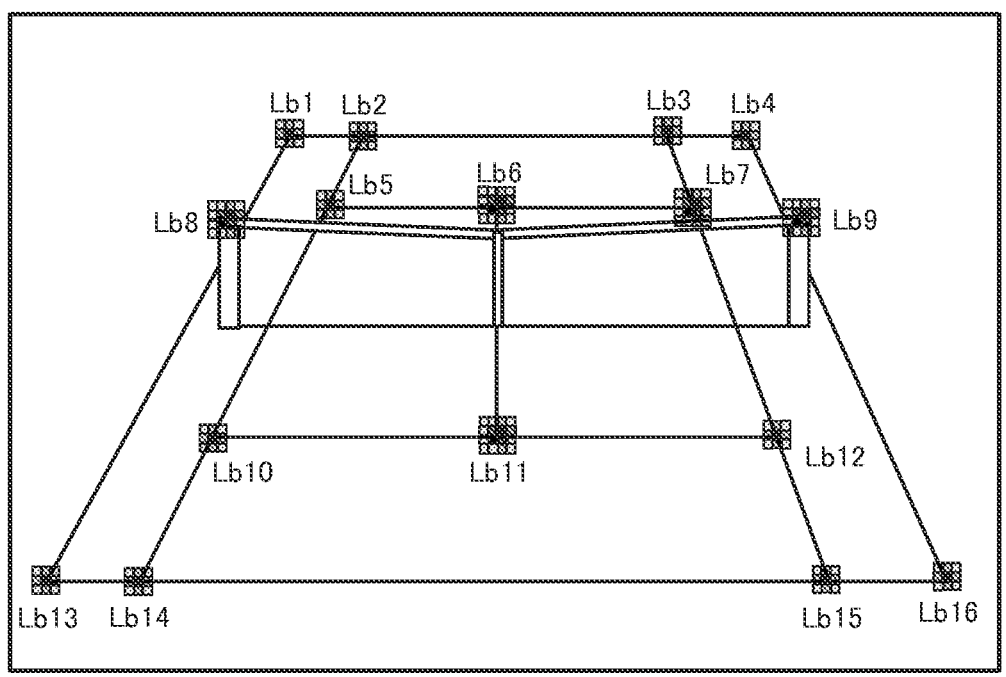
FIG. 6 illustrates a captured image with a clear indication of structural feature point information.

FIG. 6 illustrates the captured image Im with a clear indication of the structural feature point information IF generated based on the captured image Im shown in FIG. 5A. Here, as an example, it is assumed that the feature point information output unit 41 outputs, as the structural feature point information IF, the reliability map of the position of the structural feature point for each class (i.e., each label) of the structural feature points. FIG. 6 explicitly illustrates the reliability maps only for the main partial areas (here, 3 by 3 or 4 by 4 rectangular pixel areas) where the reliability is not 0. Each pixel in the reliability maps shall indicate that the darker the pixel is, the higher the reliability becomes. Further, FIG. 6 illustrates, together with each reliability map of the structural feature points, the label "Lb1" to "Lb16" of the structural feature points to which the each reliability map corresponds. The labels Lb1 to Lb16 correspond to the classes of structural feature points P1 to P16, respectively. In FIG. 6, although the reliability maps of all structural feature points are displayed in one image, actually, the identifier outputs the reliability map per label.

(5) Generating Coordinate Transformation Information

Next, a process of generating the coordinate transformation information Ic by the structure matching unit 43 will be described. By associating and matching, for each label, the position of the structural feature point in the device coordinate system with the position of the structural feature point in the structural coordinate system according to the structure data, the structure matching unit 43 generates the coordinate transformation information Ic indicating the amount of movement and the amount of rotation which are necessary to convert data in the structural coordinate system to data in the structural coordinate system.

Figure 7:
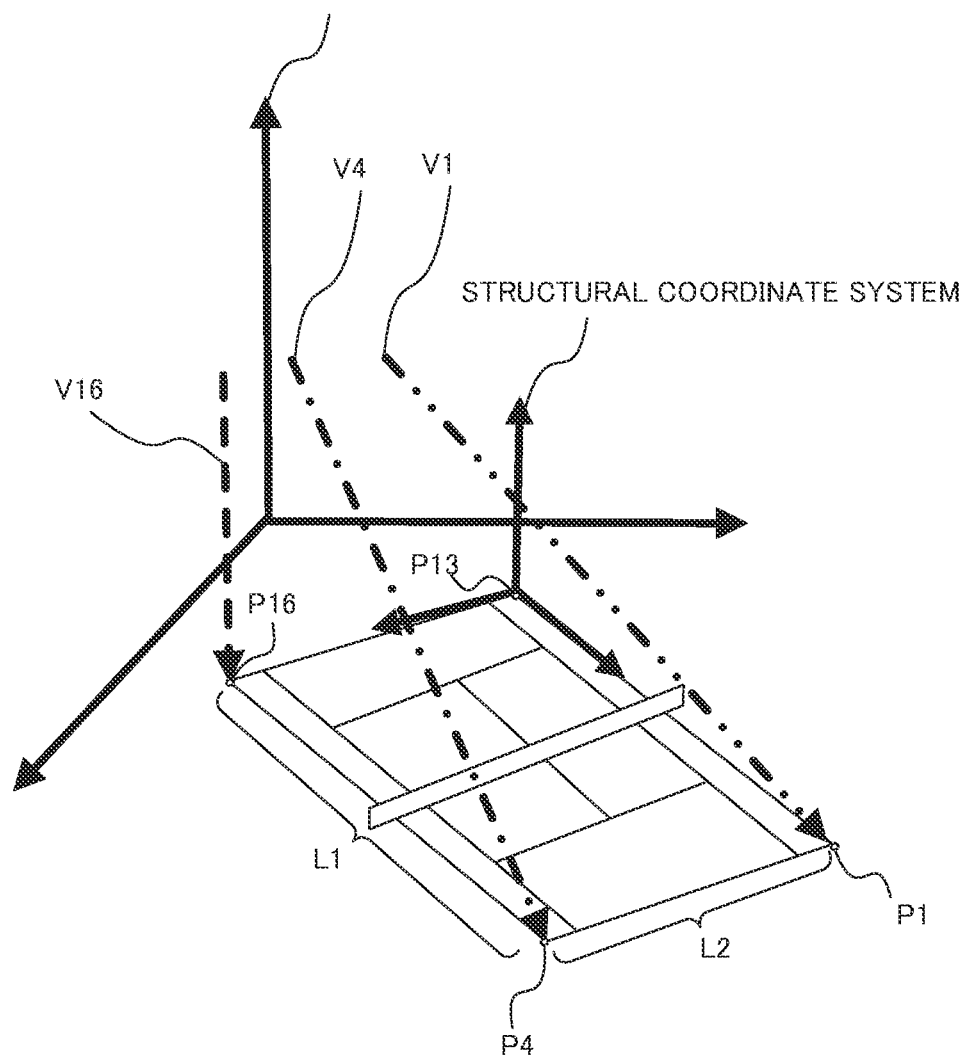
FIG. 7 illustrates the relation between the device coordinate system and the structural coordinate system.

The generation process of the coordinate transformation information Ic will be specifically described with reference to FIGS. 7 and 8. FIG. 7 illustrates the relation between the device coordinate system and the structural coordinate system.

The device coordinate system is a three-dimensional coordinate system which the display device 1 refers to. For example, based on the position and posture of the display device 1 at the time of start-up, the display device 1 determines the device coordinate system. Specifically, the display device 1 determines the device coordinate system to be: a three-dimensional coordinate system with three axes corresponding to the vertical and horizontal directions of the captured image Im and the photographing direction of the camera 15 at the time of start-up of the display device 1; or any other arbitrary three-dimensional coordinate system based on the posture of the display device 1 at the time of start-up of the display device 1.

The structural coordinate system is a coordinate system set with reference to the target structure and corresponds to the coordinate system adopted in the structure data. FIG. 7 illustrates an example of setting the structural coordinate system whose origin is the structural feature point P13 of the tennis court shown in FIG. 5A and whose axes correspond to the longitudinal and horizontal directions of the tennis court and the direction perpendicular to them. In the example of FIG. 7, the three axial directions of the structural coordinate system correspond to, respectively, the longitudinal and lateral directions of the tennis court that is the target structure and the direction perpendicular to them. Instead, the three axial directions of the structural coordinate system may be determined to be the directions of the latitude, the longitude, and the altitude.

Here, first, based on the position posture variation amount Ap, the structure matching unit 43 determines, for each combination of the structural feature point position Pd and the label Lb outputted by the feature point output unit 42, a vector (also referred to as "structural feature point vector") in the device coordinate system. FIG. 7 shows a structural feature point vector "V1" corresponding to the label Lb1 shown in FIG. 6, a structural feature point vector "V4" corresponding to the label Lb4, and a structural feature point vector "V16" corresponding to the label Lb16.

Here, a method of determining the structural feature point vector will be described in detail.

First, for convenience of explanation, a description will be given of a structural feature point vector without considering the position posture variation amount Ap (i.e., when the position posture variation amount Ap is 0). In general, the direction from the camera 15 to the photographed position represented by each pixel position of the captured image Im is different depending on the each pixel position. Therefore, the structure matching unit 43 determines the direction of the structural feature point vector based on the structural feature point position Pd indicating the pixel position in the captured image Im. In this case, for example, the structure matching unit 43 stores a map in which the direction of the structural feature point vector is associated with each pixel position in the storage unit 14, and refers to the map to determine the direction of the structural feature point vector from each structural feature point position Pd. Further, the structure matching unit 43 determines the origin of the device coordinate system to be the origin of the structural feature point vector. The length of the structural feature point vector is not specified.

Next, a description will be given of the correction of the structural feature point vector considering the position posture variation amount Ap. The structure matching unit 43 corrects, based on the magnitude of variation of the posture of the display device 1 specified by the position posture variation amount Ap, the direction of the structural feature point vector described above. In this case, for example, the structure matching unit 43 stores, in the storage unit 14, a map that associates the magnitude of variation of the posture of the display device 1 with the correction amount of the direction of the structural feature point vector and refers to the map thereby to correct the direction of the structural feature point vector of each structural feature point position Pd. Further, based on the magnitude of variation of the position of the display device 1 specified by the position posture variation amount Ap, the structure matching unit 43 translates the structural feature point vector.

Then, the structure matching unit 43 identifies the position of each structural feature point of the target structure in the device coordinate system, based on the specified structural feature point vectors and the size information of the target structure. In the example of FIG. 7, the structure matching unit 43 refers to the size information of the structure data and recognizes the longer width "L1" (i.e., the distance between the structural feature point P4 and the structural feature point P16) and the shorter width "L2" (i.e., the distance between the structural feature point P1 and the structural feature point P4) for the tennis court that is the target structure. In this case, there are structural feature points P1, P4, and P16 on extended lines of the structural feature point vectors V1, V4, and V16, respectively, and the distance between the structural feature point P1 and the structural feature point P4 is the width L2, the distance between the structural feature point P4 and the structural feature point P16 is the width L1. Therefore, the structure matching unit 43 calculates the coordinate values of the structural feature points P1, P4, and P16 in the device coordinate system satisfying such conditions.

Figure 8:
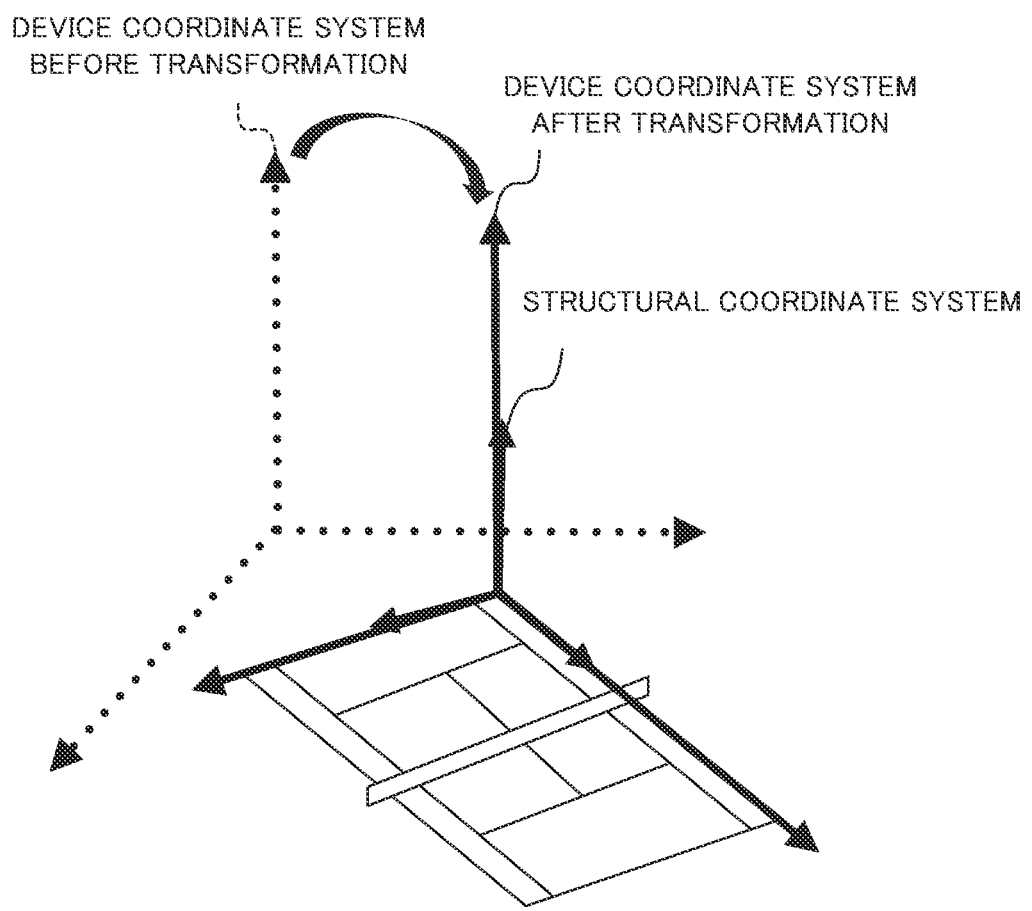
FIG. 8 illustrates the state of the device coordinate system before and after coordinate transformation.

FIG. 8 shows the state before and after the coordinate transformation of the device coordinate system shown in FIG. 7. In this case, the structure matching unit 43 performs coordinate transformation so as to match the device coordinate system with the structural coordinate system on the basis of the coordinate values of detected structural feature points in the device coordinate system and the coordinate values in the structural coordinate system recorded in the structure data. Then, the structure matching unit 43 calculates, as the coordinate transformation information Ic, the transformation parameters indicative of the rotation and translation necessary to perform the above-mentioned coordinate transformation from the device coordinate system to the structural coordinate system. In the example of FIG. 7, the structure matching unit 43 calculates the transformation parameters indicative of the rotation and translation to convert the device coordinate system to the structural coordinate system so that the coordinate values of these structural feature points P1, P4, and P16 in the device coordinate system coincide with the coordinate values in the structural coordinate system recorded in the structure data, respectively. Thus, the structure matching unit 43 can suitably generate the coordinate transformation information Ic by using, as a reference, at least three structural feature points that are not aligned on a straight line. Further, if one axis of the device coordinate system and one axis of the structural coordinate system is assumed to be equivalent, it is possible to generate the coordinate transformation information Ic using at least two structural feature points. For example, assuming that the vertical axis of the device coordinate system and the vertical axis of the structural coordinate system are equivalent, the plane of the sports field, which is the target structure, can be determined by only two points. On the other hand, when any axis of the device coordinate system (the first coordinate system) is different from any axis of the structural coordinate system (the second coordinate system), the structure matching unit 43 use, as described above, at least three structural feature points that are not aligned on a straight line as a reference to generate the coordinate transformation information Ic.

In the example of FIGS. 7 and 8, the structure matching unit 43 may generate the coordinate transformation information Ic based on more than three structural feature points instead of generating the coordinate transformation information Ic based on three structural feature points according to the example shown in FIGS. 7 and 8. In this case, based on the structural feature point vector calculated from each structural feature point and each distance between structural feature points indicated by the size information, the structure matching unit 43 calculates the coordinate value, in the device coordinate system, of the structural feature point existing on each structural feature point vector by applying a regression analysis method such as the least squares method. Further, the structure matching unit 43 calculates the transformation parameters indicative of rotation and translation from the device coordinate system to the structural coordinate system by using the least squares method or the like based on the coordinate value of each structural feature point in the device coordinate system and the coordinate value in the structural coordinate system recorded in the structure data.

Here, in some embodiments, based on the reliabilities of the structural feature points detected from the captured image Im, the structure matching unit 43 may select Nr (Nr is an integer of 3 or more) structural feature points to be used for calculating the coordinate transformation information Ic may be selected. For example, the structure verification unit 43 refers to the structural feature point information IF calculated by the feature point information output unit 41 and acquires the reliability of each structural feature point. For example, when the identifier used by the feature point information output unit 41 outputs the reliability map for each structural feature point, the structure verification unit 43 determines the reliability of each structural feature point to be the maximum reliability in the reliability map for each structural feature point. Then, the structure matching unit 43 calculates the coordinate transformation information Ic using Nr structural feature points with the top Nr reliabilities. Thus, the structure matching unit 43 can suitably calculate the accurate coordinate transformation information Ic using only the structural feature points with high reliability.

In another example, in consideration of the fact that pixels at the edge portion of the image is easily affected by the lens distortion, the structure matching unit 43 may select the structural feature points to be used for calculating the coordinate transformation information Ic according to the detected position (i.e., the structural feature point position Pd) of each structural feature point in the captured image Im. For example, the information indicative of an area in the captured image Im where the influence of the distortion of the lens does not substantially occur is stored in advance in the storage unit 14, and the feature point information output unit 41 selects the detected structural feature points in the above area as the structural feature points to be used for calculation of the coordinate transformation information Ic. According to this aspect, the structure matching unit 43 can suitably calculate accurate coordinate transformation information Ic using the information of the structural feature points that are not substantially affected by the distortion of the lens.

If the display device 1 cannot detect three or more structural feature points to be used for calculating the coordinate transformation information Ic from one captured image Im, the display device may calculate the coordinate transformation information Ic based on the structural feature points detected from multiple captured images Im. Even in this case, the structure matching unit 43 corrects the structural feature point vectors for the structural feature points detected from each captured image Im by using the position posture variation amount Ap at the time of acquiring the each captured image Im. Accordingly, the structure matching unit 43 can suitably calculate the coordinate transformation information Ic based on multiple captured images Im without being affected by changes in position and posture at the time of acquiring each captured image Im.

(6) Processing Flow

Figure 9:
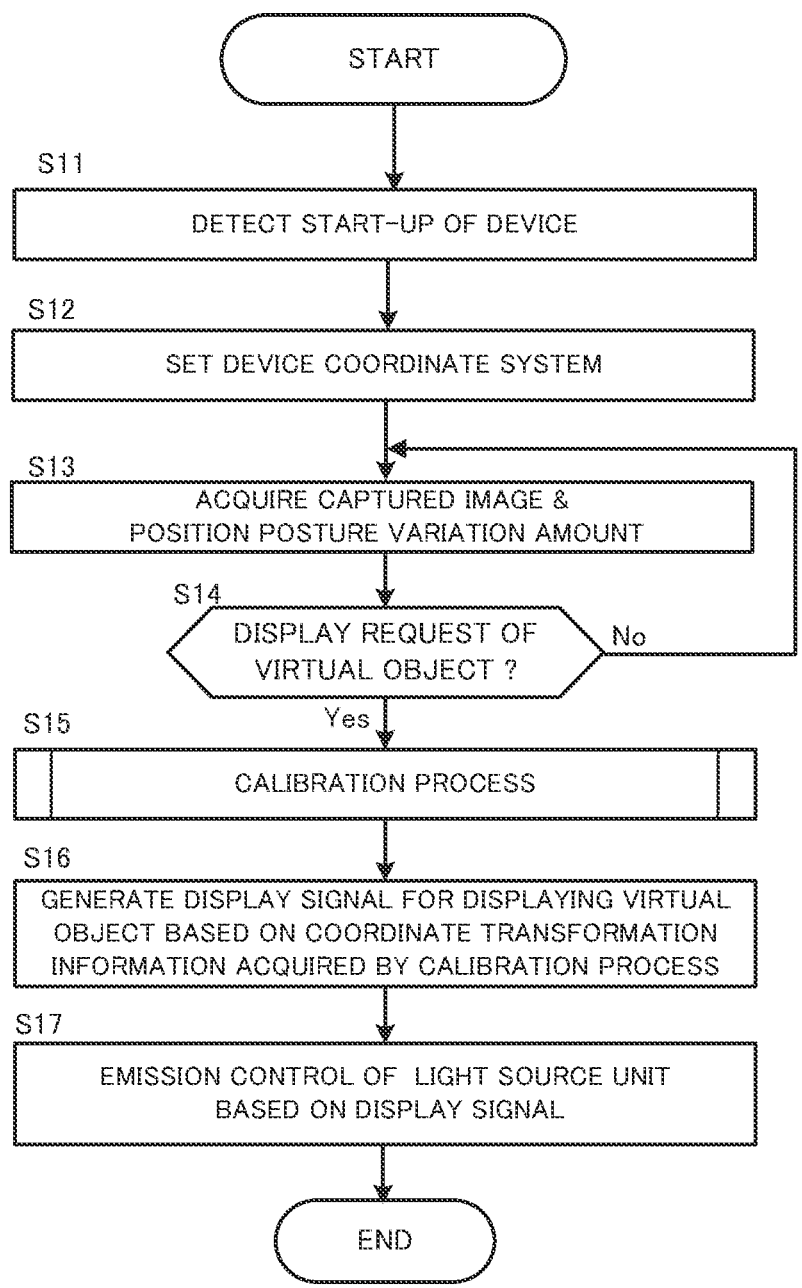
FIG. 9 is an example of a flowchart showing a processing outline relating to the display processing of the virtual object to be executed by the control unit according to the first example embodiment.

FIG. 9 is an example of a flowchart indicative of outline relating to the display process of the virtual object executed by the control unit 17 in the first example embodiment.

First, the control unit 17 detects the start-up (activation) of the display device 1 (step S11). In this case, the control unit 17 sets the device coordinate system based on the posture and position of the display device 1 at the time of start-up of the display device 1 (step S12). Thereafter, the control unit 17 acquires the captured image Im generated by the camera 15, and acquires the position posture variation amount Ap based on the detection signal outputted by the position posture detection sensor 16 (step S13). The control unit 17 stores the combination of the captured image Im and the position posture variation amount Ap acquired at step S13 in the sensor data storage unit 20.

Then, the control unit 17 determines whether or not there is a display request for a virtual object (step S14). For example, when the virtual object acquisition unit 40 receives the distribution information which instructs the display of the virtual object from the server device (not shown) managed by a promoter, it determines that there is a display request for the virtual object. When there is no display request for the virtual object (step S14; No), the captured image Im and the position posture variation amount Ap are continuously acquired at step S13.

On the other hand, if there is a display request for the virtual object (step S14; Yes), the control unit 17 executes the calibration process (step S15). Details of the procedure of this calibration process will be described later with reference to FIG. 10.

Next, based on the coordinate transformation information Ic acquired by the calibration process at step S15, the reflection unit 44 of the control unit 17 generates a display signal Sd for displaying the virtual object according to the display request indicative of the virtual object and the display position (step S16). In this case, in practice, as with the various conventional AR display products, the control unit 17 recognizes a space that the user visually recognizes in the AR coordinate system in consideration of the user's eye gaze direction and the position posture variation amount Ap, and generates the display signal Sd so that the virtual object is displayed at the designated position in the space. Then, the light source control unit 45 of the control unit 17 performs emission control of the light source unit 10 based on the display signal Sd (step S17).

The procedure of the flowchart shown in FIG. 9 is an example, and it is possible to apply various modifications to the processing procedure.

For example, the control unit 17 does not have to execute the calibration process at step S15 every time there is a display request of the virtual object. Instead, the control unit 17 may perform the calibration process only if a predetermined time or more has elapsed from the previous calibration process. Thus, it is sufficient for the control unit 17 to perform the calibration process at least once after the start-up of the display device 1.

Further, the control unit 17 does not have to determine the device coordinate system with reference to the position and the posture of the display device 1 at the time of start-up of the display device 1. Alternatively, for example, the control unit 17 may determine the device coordinate system set with reference to the position and posture of the display device 1 at the time of a first display request after the start-up of the display device 1 (i.e., at the time of performing the calibration process first). In another example, whenever there is a display request, the control unit 17 may reset the device coordinate system with reference to the position and the posture of the display device 1 at the time of the display request (i.e., at the time of performing the calibration process). In this case, it is not necessary to use the position posture variation amount Ap in the generation process of the coordinate transformation information Ic to be described later.

Figure 10:
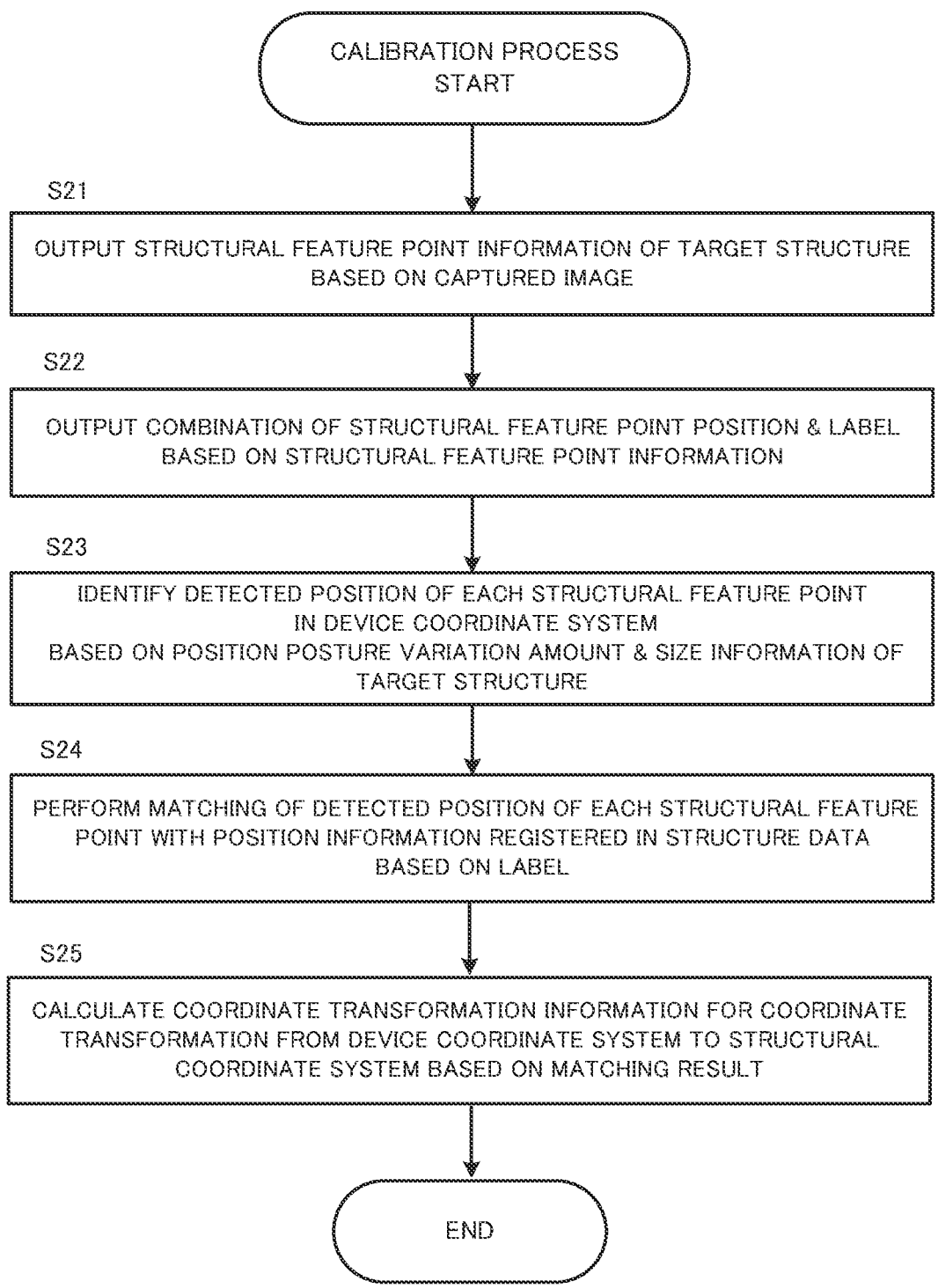
FIG. 10 is an example of a flowchart showing a detailed processing procedure of the calibration process.

FIG. 10 is an example of a flowchart showing a detailed processing procedure of the calibration process at step S15 in FIG. 9.

First, the feature point information output unit 41 of the control unit 17 outputs the structural feature point information IF associated with the structural feature points of the target structure based on the captured image Im acquired from the sensor data storage unit 20 or the like (step S21). In this case, the feature point information output unit 41 configures an identifier based on the parameter acquired from the parameter storage unit 21, and acquires the structural feature point information IF by inputting the captured image Im to the identifier. Then, the feature point output unit 42 outputs the combination of the structural feature point position Pd and the label Lb for each of the structural feature points based on the structural feature point information IF outputted by the feature point information output unit 41 (step S22).

Next, the structure matching unit 43 identifies the detected position of each structural feature point in the device coordinate system based on the position posture variation amount Ap calculated at step S13 in FIG. 9 and the size information of the target structure stored in the structure data storage unit 22. In this case, as described with reference to FIGS. 7 and 8, the structure matching unit 43 identifies the detected position of each structural feature point in the device coordinate system based on: the structural feature point vectors specified by the structural feature point positions Pd and the position posture variation amount Ap; and the distance among the structural feature points.

Then, the structure matching unit 43 associates and matches, for each label of the structural feature points, the detected position of the structural feature point in the device coordinate system specified at step S23 with the position of the structural feature point in the structural coordinate system indicated by the registered position information included in the structure data (step S24). Then, the structure matching unit 43 calculates the coordinate transformation information Ic for coordinate transformation from the device coordinate system to the structural coordinate system so that the associated and matched positions coincide with each other for each label (step S25).

Next, a supplementary description will be given of the effect of the first example embodiment.

The display device 1 configures an identifier to output the structural feature point information IF by referring to the parameter storage unit 21. In this case, since it is possible to learn the identifier in advance using training images corresponding to various imaging environments and variations of the target structure, the display device 1 can generate the structural feature point information IF robustly against changes in the photographing environment and variations of the target structure.

Further, in the calibration process, the display device 1 performs matching of the information obtained by extracting only the structural feature points (i.e., the structural feature points to which the registered labels are assigned) registered in advance from the captured image Im with the information on the structural feature points registered in the structure data. Thus, the calculation amount required for the matching process for calculating the coordinate transformation information Ic is greatly reduced, and it leads to robust calculation of the coordinate transformation information Ic that is not affected by the extraction of noise (i.e., feature points which do not belong to the target structure) included in the captured image Im. When calculating the coordinate transformation information Ic, in order to consider the actual scale of the target structure, the structure data may include, as size information in advance, information on the actual scale of the target structure already measured at the time of designing or predetermined based on the competition rule.

Second Example Embodiment

Figure 11:
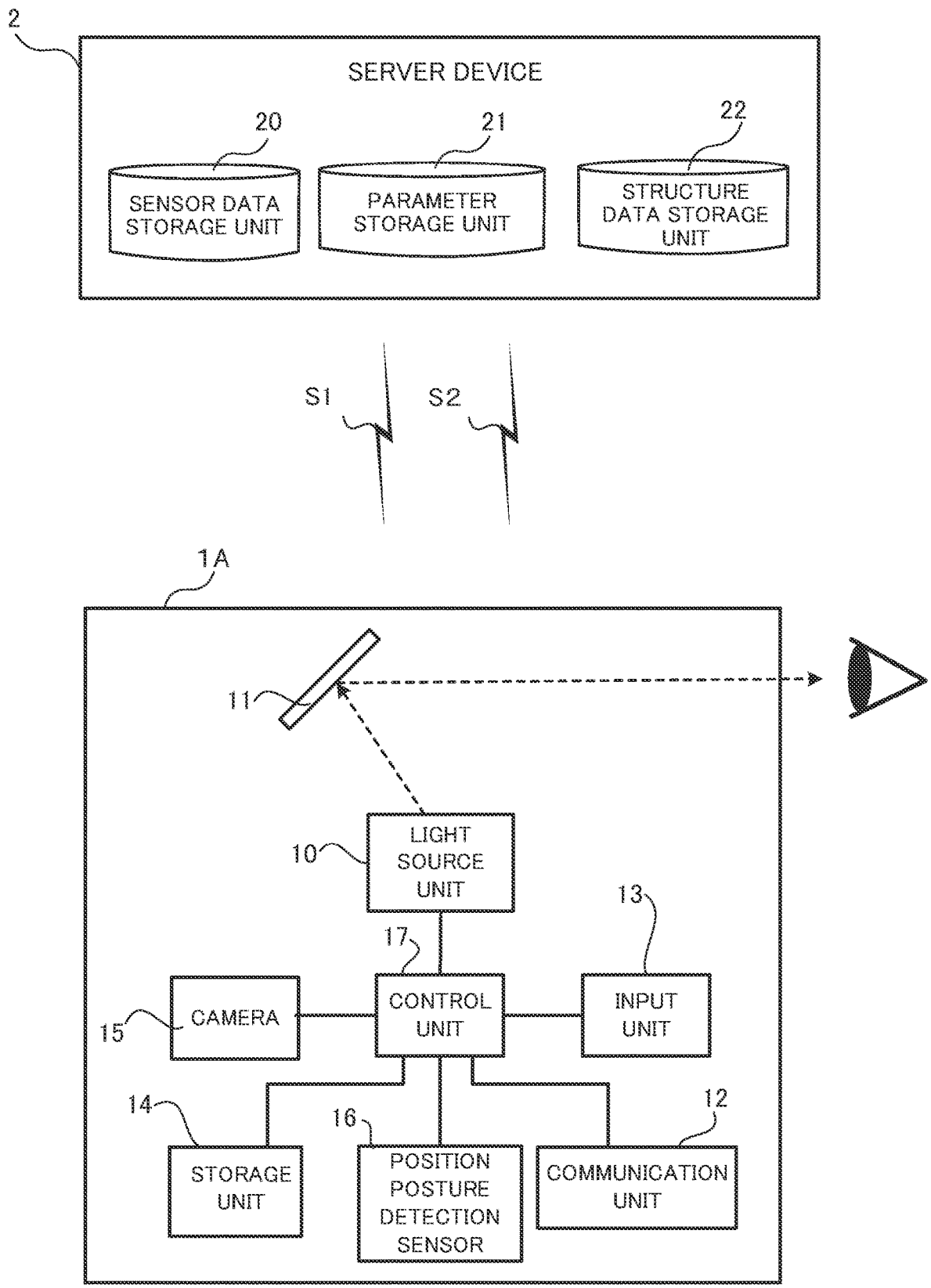
FIG. 11 illustrates a configuration of a display system in a second example embodiment.

FIG. 11 shows the configuration of the display system according to the second example embodiment. As shown in FIG. 11, the display system according to the second example embodiment includes a display device 1A and a server device 2. The second example embodiment differs from the first example embodiment in that the server device 2 executes the calibration process and the like in substitution for the display device 1A. Hereinafter, the same components as in the first example embodiment are appropriately denoted by the same reference numerals, and the description thereof will be omitted.

The display device 1A transmits an upload signal "S1", which is information necessary for the server device 2 to perform calibration processing and the like, to the server device 2. In this case, the upload signal S1 includes, for example, the position posture variation amount Ap detected based on the output by the position posture detection sensor 16 and the captured image Im generated by the camera 15. When receiving the distribution signal "S2" transmitted from the server device 2, the display device 1A displays the virtual object by performing the light emission control of the light source unit 10 based on the distribution signal S2. For example, the distribution signal S2 includes information corresponding to the display signal Sd according to the first example embodiment, and the display device 1A lets the light source unit 10 emit light for displaying the virtual object by performing the same processing as the processing executed by the light source control unit 45 according to the first example embodiment after receiving the distribution signal S2.

Figure 12:
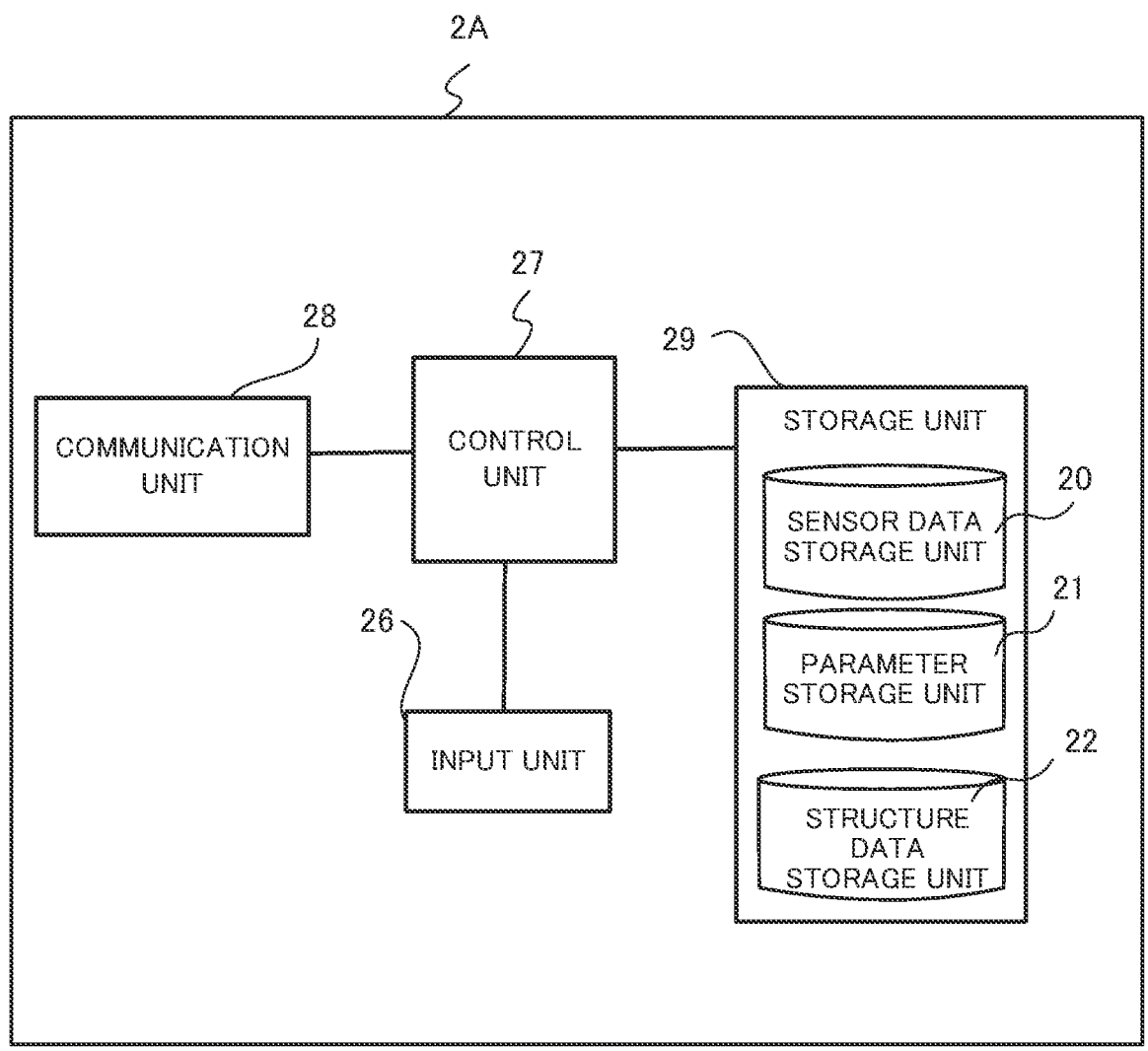
FIG. 12 is a block diagram of a server device in the second example embodiment.

The server device 2 is, for example, a server device managed by a promoter and generates the distribution signal S2 and transmits the distribution signal S2 to the display device 1A based on the upload signal S1 received from the display device 1A. FIG. 12 is a block diagram of a server device 2. The server device 2 includes an input unit 26, a control unit 27, a communication unit 28, and a storage unit 29.

The storage unit 29 is a nonvolatile memory which stores various information necessary for the control unit 27 to control the server device 2. The storage unit 29 stores a program the control unit 27 executes. The storage unit 29 includes a sensor data storage unit 20, a parameter storage unit 21, and a structure data storage unit 22. Under the control by the control unit 27, the captured image Im and the position posture variation amount Ap included in the upload signal S1 is stored in the sensor data storage unit 20. The storage unit 29 may be an external storage device such as a hard disk connected to or built in to the server device 2, or may be a storage medium such as a flash memory. The storage unit 29 may be a server device that performs data communication with the server device 2 (i.e., a device that stores information to which another device can refer). In this case, the storage unit 29 includes a plurality of server devices, and the sensor data storage unit 20, the parameter storage unit 21, and the structure data storage unit 22 may be stored in a distributed manner.

The control unit 27 includes, for example, one or more processors such as a CPU and a GPU, a volatile memory that functions as a work memory, and the like, and performs overall control of the server device 2. The control unit 27 generates information (i.e., information corresponding to the designation display information Id in the first example embodiment) indicative of a virtual object to be displayed and its display position based on a user input to the input unit 26 or the like. Further, the control unit 27 executes the calibration process shown in FIG. 10 by referring to the sensor data storage unit 20, the parameter storage unit 21, and the structure data storage unit 22, and generates the distribution signal S2. Thus, the control unit 27 includes functions corresponding to the virtual object acquisition unit 40, the feature point information output unit 41, the feature point output unit 42, the structure matching unit 43, and the reflection unit 44 shown in FIG. 3.

Figure 13:
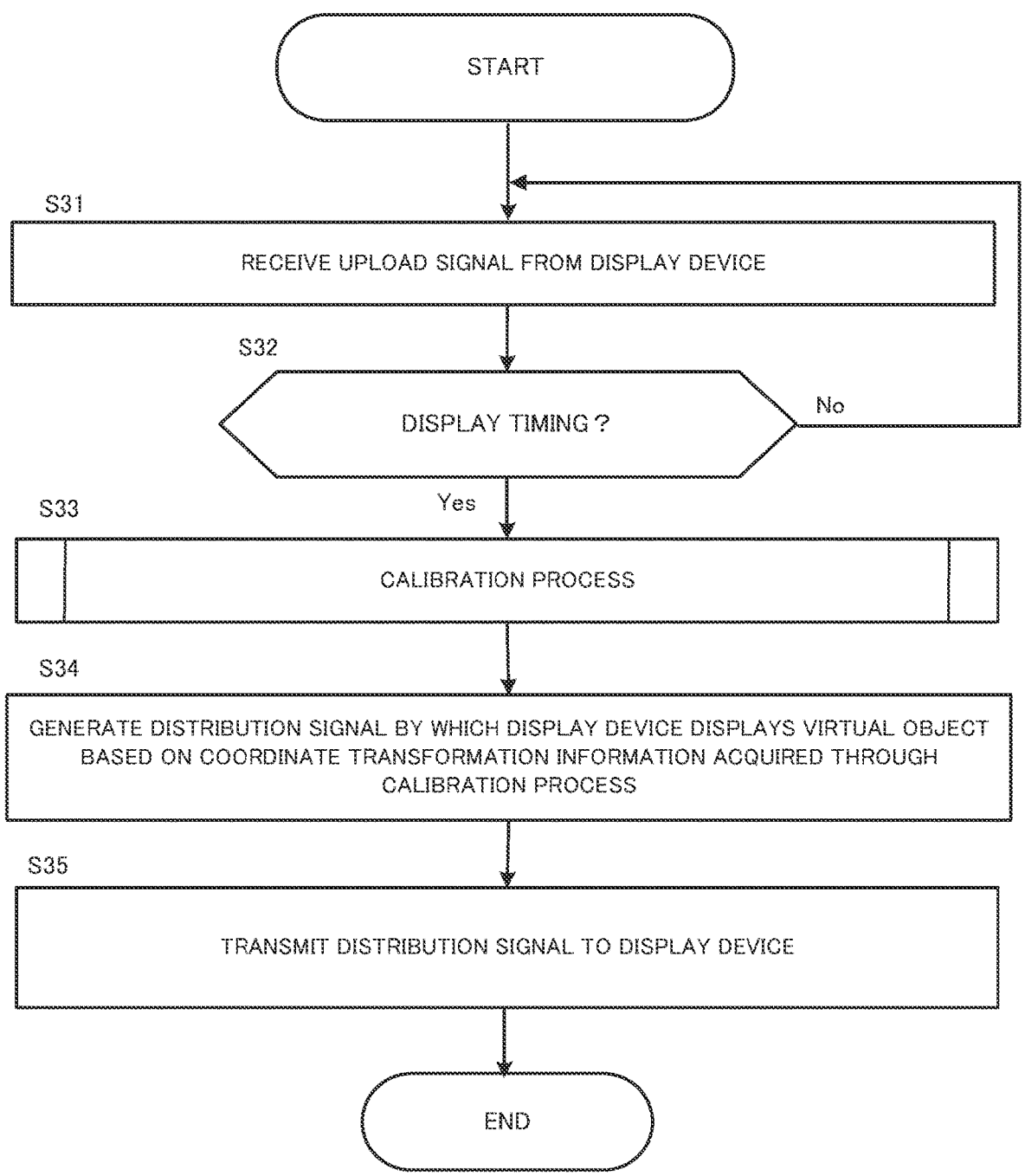
FIG. 13 is an example of a flowchart showing a processing procedure to be executed by the control unit of the server device in the second example embodiment.

FIG. 13 is an example of a flowchart illustrating a processing procedure to be executed by the control unit 27 of the server device 2 in the second example embodiment.

First, the control unit 27 receives, via the communication unit 28, the upload signal S1 including the captured image Im and the position attitude variation amount Ap from the display device 1A (step S31). In this case, the control unit 27 updates the data to be stored in the sensor data storage unit 20 based on the upload signal S1. The control unit 27 determines whether or not to display the virtual object (step S32). Then, the control unit 27 determines it is not a timing to display the virtual object (step S32; No), the control unit 27 continues to receive the upload signal S1 from the display device 1A at step S31.

On the other hand, when the control unit 27 determines that it is a timing to display (step S32; Yes), the control unit 27 executes the calibration process based on the latest upload signal S1 received at step S31. In this case, the control unit 27 executes the flowchart shown in FIG. 10. Then, based on the coordinate transformation information Ic acquired through the calibration process, the control unit 27 generates the distribution signal S2 by which the display device 1A displays the virtual object (step S34). Then, the control unit 27 transmits the generated distribution signal S2 to the display device 1A through the communication unit 28 (step S35). Thereafter, the display device 1A which has received the distribution signal S2 displays the virtual object by controlling the light source unit 10 based on the distribution signal S2.

As described above, according to the second example embodiment, the display system can accurately calculate the coordinate transformation information Ic required for displaying the virtual object by the display device 1A and allow the user to suitably view the virtual object.

In the second example embodiment, the display device 1A may perform the calibration process in place of the server device 2. In this case, the display device 1A receives, as necessary, the information required for the calibration process from the server device 2, and executes the processing of the flowchart shown in FIGS. 9 and 10. Even in this mode, the display system can allow the user of the display device 1A to suitably view the virtual object.

Third Example Embodiment

Figure 14:
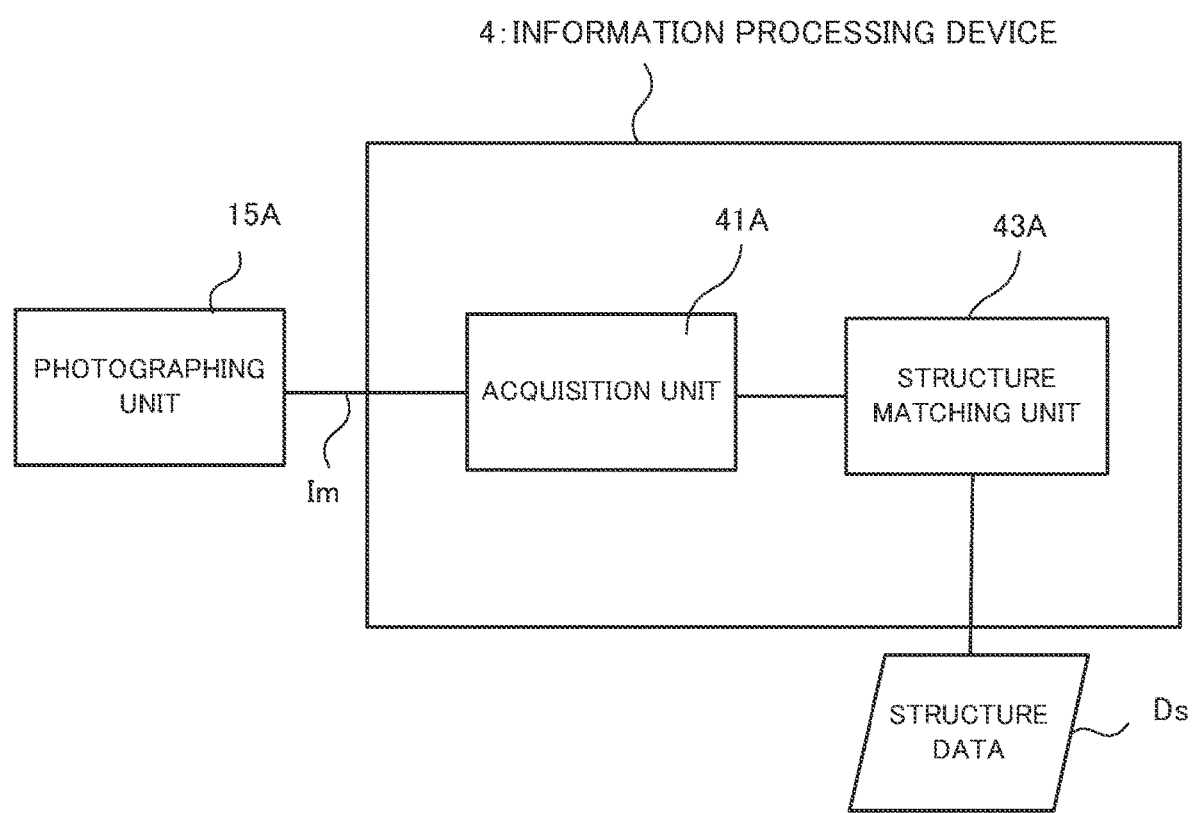
FIG. 14 illustrates a schematic configuration of an information processing device in a third example embodiment.

FIG. 14 shows a schematic configuration of an information processing device 4 according to the third example embodiment. As shown in FIG. 14, the information processing device 4 includes an acquisition unit 41A and a structure matching unit 43A. The information processing device 4 is realized by, for example, the control unit 17 of the display device 1 in the first example embodiment or the control unit 27 of the server device 2 in the second example embodiment.

The acquisition unit 41A is configured to acquire, from a captured image captured by a photographing unit 15A of a display device configured to display a virtual object superimposed on a view, multiple combinations of classification information of a structural feature point that is a feature point, in structure, of a target structure and position information of the structural feature point. Examples of the display device described above include the display device 1 according to the first example embodiment or the display device 1A according to the second example embodiment. Further, the information processing device 4 and the display device may be the same device. Examples of "multiple combinations of classification information of structural feature points and position information of the structural feature point" include multiple combinations of the structural feature point position Pd and the label Lb for multiple structural feature points in the first example embodiment or the second example embodiment.

The structure matching unit 43A is configured to generate coordinate transformation information by matching structure data "Ds" with the multiple combinations, the structure data Ds including information associated with a position and a class of each of structural feature points of the target structure, the coordinate transformation information relating to a coordinate transformation between a first coordinate system that is a coordinate system referred to by the display device and a second coordinate system that is a coordinate system adopted in the structure data Ds. The first coordinate system, for example, corresponds to the device coordinate system in the first example embodiment and the second example embodiment. The second coordinate system, for example, corresponds to the structural coordinate system in the first example embodiment and the second example embodiment.

According to this mode, the information processing device 4 can suitably generate the coordinate transformation information relating to the coordinate transformation between the coordinate system referred to by the display device and the coordinate system used in the structure data Ds.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments (including modifications, the same shall apply hereinafter) described above can be described as, but not limited to, the following Supplementary Notes.

[Supplementary Note 1]

An information processing device comprising:
  an acquisition unit configured to acquire, from a captured image captured by a photographing unit of a display device configured to display a virtual object superimposed on a view,
    multiple combinations of classification information of a structural feature point that is a feature point, in structure, of a target structure and position information of the structural feature point; and
  a structure matching unit configured to generate coordinate transformation information by matching structure data with the multiple combinations, the structure data including information associated with a position and a class of each of structural feature points of the target structure,
the coordinate transformation information relating to a coordinate transformation between a first coordinate system that is a coordinate system referred to by the display device and a second coordinate system that is a coordinate system adopted in the structure data.

[Supplementary Note 2]

The information processing device according to Supplementary Note 1,
wherein the acquisition unit configures an identifier based on parameters of the identifier learned using a plurality of images and correct answer data, and acquires the multiple combinations by inputting the captured image to the identifier,
the plurality of images being acquired by photographing the target structure or a structure with the same type as the target structure,
the correct answer data relating to a position, in the images, of each of the structural feature points of the target structure and a class thereof.

[Supplementary Note 3]

The information processing device according to Supplementary Note 2,
wherein the identifier outputs, based on the captured image, a reliability map for each class of the structural feature points, and
wherein the acquisition unit determines the multiple combinations based on a position, in the captured image, corresponding to a maximum reliability in the reliability map for each class of the structural feature points.

[Supplementary Note 4]

The information processing device according to Supplementary Note 2,
wherein the identifier outputs, based on the captured image, a coordinate value for each class of the structural feature points, and
wherein the acquisition unit determines the multiple combinations based on the coordinate value for each class of the structural feature points.

[Supplementary Note 5]

The information processing device according to any one of Supplementary Notes 1 to 4,
wherein when one axis of the first coordinate system is equivalent to one axis of the second coordinate system, the structure matching unit generates the coordinate transformation information by matching the multiple combinations relating to at least two structural feature points with the structure data, and
wherein when any axis of the first coordinate system is different from any axis of the second coordinate system, the structure matching unit generates the coordinate transformation information by matching the multiple combinations relating to at least three structural feature points and the structure data.

[Supplementary Note 6]

The information processing device according to Supplementary Note 5,
wherein, based on the reliability of the position information of the structural feature points acquired by the acquisition unit, the structure matching unit selects structural feature points to be used for matching with the structure data.

[Supplementary Note 7]

The information processing device according to Supplementary Note 5,
wherein the structure matching unit selects structural feature points to be used for matching with the structure data based on a position, in the captured image, indicated by the position information of the structural feature points acquired by the acquisition unit.

[Supplementary Note 8]

The information processing device according to any one of Supplementary Notes 1 to 7,
wherein the structure matching unit generates the coordinate transformation information by matching
positions of the structural feature points in the first coordinate system identified based on size information of the target structure and the position information of the structural feature points acquired by the acquisition unit
with positions of the structural feature points in the second coordinate system indicated by the structure data.

[Supplementary Note 9]

The information processing device according to Supplementary Note 8,
wherein the structural matching unit identifies a position of each of the structural feature points in the first coordinate system based on
the size information,
the position information of the structural feature points acquired by the acquisition unit, and
a magnitude of variation from the position and posture of the display device used to set the first coordinate system to the position and posture of the display device at the time of acquiring the captured image.

[Supplementary Note 10]

The information processing device according to any one of Supplementary Notes 1 to 9,
wherein the information processing device is the display device,
the information processing device further comprising
a light source unit configured to emit a display light for displaying the virtual object, and
an optical element configured to reflect at least a portion of the display light thereby to let a viewer visually recognize the virtual object superimposed on the view.

[Supplementary Note 11]

The information processing device according to any one of Supplementary Notes 1 to 9,
wherein the information processing device is a server device configured to communicate with the display device,
the information processing device further comprising
a communication unit configured to receive the captured image from the display device and transmit a display signal generated based on the coordinate transformation information to the display device.

[Supplementary Note 12]

A control method executed by the information processing device, the control method comprising
acquiring, from a captured image captured by a photographing unit of a display device configured to display a virtual object superimposed on a view,
multiple combinations of classification information of a structural feature point that is a feature point, in structure, of a target structure and position information of the structural feature point; and
generating coordinate transformation information by matching structure data with the multiple combinations, the structure data including information associated with a position and a class of each of structural feature points of the target structure, the coordinate transformation information relating to a coordinate transformation between a first coordinate system that is a coordinate system referred to by the display device and a second coordinate system that is a coordinate system adopted in the structure data.

[Supplementary Note 13]

A storage medium storing a program executed by a computer, the program causing the computer to function as:

an acquisition unit configured to acquire, from a captured image captured by a photographing unit of a display device configured to display a virtual object superimposed on a view, multiple combinations of classification information of a structural feature point that is a feature point, in structure, of a target structure and position information of the structural feature point; and a structure matching unit configured to generate coordinate transformation information by matching structure data with the multiple combinations, the structure data including information associated with a position and a class of each of structural feature points of the target structure, the coordinate transformation information relating to a coordinate transformation between a first coordinate system that is a coordinate system referred to by the display device and a second coordinate system that is a coordinate system adopted in the structure data.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A Display device
2 Server device
3 Learning device
4 Information processing device
10 Light source unit
11 Optical element
12 Communication unit
13 Input unit
14 Storage unit
15 Camera
16 Position posture detection sensor
20 Sensor data storage unit
21 Parameter storage unit
22 Structure data storage unit

What is claimed is:

1. An information processing device comprising:
at least one memory configured to store instructions; and
at least one processor configured to execute the instructions to:

input a captured image captured by a camera of a display device configured to display a virtual object superimposed on a view to an identifier;

acquire multiple combinations of classification information of a structural feature point that is a feature point, in structure, of a target structure and position information of the structural feature point, wherein the multiple combinations are output from the identifier in response to input of the captured image, the captured image includes plural structural feature points of the target structure, and the identifier has learned a relation between an image which includes the plural structural feature points, and a position and a class of each of the plural structural feature points; and generate coordinate transformation information by matching structure data with the multiple combinations, wherein the structure data includes information associated with the position and the class of each of the plural structural feature points of the target structure, and the coordinate transformation information relates to a coordinate transformation between a first coordinate system that is a coordinate system referred to by the display device and a second coordinate system that is a coordinate system adopted in the structure data, wherein when one axis of the first coordinate system is equivalent to one axis of the second coordinate system, the at least one processor is configured to execute the instructions to generate the coordinate transformation information by matching the multiple combinations relating to at least two of the plural structural feature points with the structure data, and wherein when any axis of the first coordinate system is different from any axis of the second coordinate system, the at least one processor is configured to execute the instructions to generate the coordinate transformation information by matching the multiple combinations relating to at least three of the plural structural feature points and the structure data.

2. The information processing device according to claim 1,
wherein the at least one processor is configured to execute the instructions to configure the identifier based on parameters of the identifier learned using a plurality of images that each include the plural structural feature points and correct answer data, and acquire the multiple combinations by inputting the captured image to the identifier, the correct answer data relating to the position, in the images, and the class of each of the plural structural feature points.

3. The information processing device according to claim 2,
wherein the identifier outputs, based on the captured image, a reliability map for the class of each of the plural structural feature points, and wherein the at least one processor is configured to execute the instructions to determine the multiple combinations based on the position, in the captured image, corresponding to a maximum reliability in the reliability map for the class of each of the plural structural feature points.

4. The information processing device according to claim 2,
wherein the identifier outputs, based on the captured image, a coordinate value for the class of each of the plural structural feature points, and wherein the at least one processor is configured to execute the instructions to determine the multiple combinations based on the coordinate value for the class of each of the plural structural feature points.

5. The information processing device according to claim 1, wherein, based on a reliability of the position information, the at least one processor is configured to execute the instructions to select which of the plural structural feature points are to be used for matching with the structure data.

6. The information processing device according to claim 1, wherein the at least one processor is configured to execute the instructions to select which of the plural structural feature points are to be used for matching with the structure data based on a position, in the captured image, indicated by the position information.

7. The information processing device according to claim 1, wherein the information processing device is the display device, the information processing device further comprising:
a light source configured to emit a display light for displaying the virtual object, and
an optical element configured to reflect at least a portion of the display light to permit a viewer to visually recognize the virtual object superimposed on the view.

8. The information processing device according to claim 1, wherein the information processing device is a server device configured to communicate with the display device, the at least one processor is configured to further execute the instructions to receive the captured image from the display device and transmit a display signal generated based on the coordinate transformation information to the display device.

9. An information processing device comprising:
at least one memory configured to store instructions; and
at least one processor configured to execute the instructions to:
input a captured image captured by a camera of a display device configured to display a virtual object superimposed on a view to an identifier;
acquire multiple combinations of classification information of a structural feature point that is a feature point, in structure, of a target structure and position information of the structural feature point, wherein
the multiple combinations are output from the identifier in response to input of the captured image,
the captured image includes plural structural feature points of the target structure, and
the identifier has learned a relation between an image which includes the plural structural feature points, and a position and a class of each of the plural structural feature points; and
generate coordinate transformation information by matching structure data with the multiple combinations, wherein
the structure data includes information associated with the position and the class of each of the plural structural feature points of the target structure, and
the coordinate transformation information relates to a coordinate transformation between a first coordinate system that is a coordinate system referred to by the display device and a second coordinate system that is a coordinate system adopted in the structure data,
wherein the at least one processor is configured to execute the instructions to generate the coordinate transformation information by matching the position of each of the plural structural feature points in the first coordinate system identified based on size information of the target structure and the position information with the position of each of the plural structural feature points in the second coordinate system indicated by the structure data.

10. The information processing device according to claim 9, wherein the at least one processor is configured to execute the instructions to identify the position of each of the plural structural feature points in the first coordinate system based on the size information, the position information, and a magnitude of variation from a position and posture of the display device used to set the first coordinate system to a position and posture of the display device at a time of acquiring the captured image.

11. A control method executable by an information processing device, the control method comprising:
inputting a captured image captured by a camera of a display device configured to display a virtual object superimposed on a view to an identifier;
acquiring multiple combinations of classification information of a structural feature point that is a feature point, in structure, of a target structure and position information of the structural feature point, wherein
the multiple combinations are output from the identifier in response to input of the captured image,
the captured image includes plural structural feature points of the target structure, and
the identifier has learned a relation between an image which includes the plural structural feature points, and a position and a class of each of the plural structural feature points; and
generating coordinate transformation information by matching structure data with the multiple combinations, wherein
the structure data includes information associated with the position and the class of each of the plural structural feature points of the target structure, and
the coordinate transformation information relates to a coordinate transformation between a first coordinate system that is a coordinate system referred to by the display device and a second coordinate system that is a coordinate system adopted in the structure data,
wherein when one axis of the first coordinate system is equivalent to one axis of the second coordinate system, the coordinate transformation information is generated by matching the multiple combinations relating to at least two of the plural structural feature points with the structure data, and
wherein when any axis of the first coordinate system is different from any axis of the second coordinate system, the coordinate transformation information is generated by matching the multiple combinations relating to at least three of the plural structural feature points and the structure data.

* * * * *